(12) United States Patent
Lester et al.

(10) Patent No.: US 12,524,711 B2
(45) Date of Patent: Jan. 13, 2026

(54) PARAMETER EFFICIENT PROMPT TUNING FOR EFFICIENT MODELS AT SCALE

(71) Applicant: Google LLC, Mountain View, CA (US)

(72) Inventors: Brian David Lester, Mountain View, CA (US); Rami Al-Rfou, Menlo Park, CA (US); Noah Constant, Los Angeles, CA (US)

( * ) Notice: Subject to any disclaimer, the term of this patent is extended or adjusted under 35 U.S.C. 154(b) by 833 days.

(21) Appl. No.: 17/718,738

(22) Filed: Apr. 12, 2022

(65) Prior Publication Data

US 2023/0325725 A1 Oct. 12, 2023

(51) Int. Cl.

| G06N 20/20 | (2019.01) |
|---|---|
| G06F 16/2455 | (2019.01) |
| G06F 16/55 | (2019.01) |
| G06F 40/30 | (2020.01) |
| G06N 3/0455 | (2023.01) |
| G06N 3/08 | (2023.01) |
| G06N 3/084 | (2023.01) |
| G06V 10/44 | (2022.01) |
| G06V 10/764 | (2022.01) |
| G06V 10/774 | (2022.01) |
| G06V 10/776 | (2022.01) |
| G06V 10/82 | (2022.01) |

(52) U.S. Cl.
CPC .......... *G06N 20/20* (2019.01); *G06V 10/764* (2022.01); *G06V 10/7747* (2022.01); *G06F 16/2455* (2019.01); *G06F 16/55* (2019.01); *G06F 40/30* (2020.01); *G06N 3/0455* (2023.01); *G06N 3/08* (2013.01); *G06N 3/084* (2013.01); *G06V 10/454* (2022.01); *G06V 10/776* (2022.01); *G06V 10/82* (2022.01)

(58) Field of Classification Search
CPC ...... G06N 20/20; G06N 3/084; G06N 3/0455; G06N 3/08; G06N 3/08; G06V 10/764; G06V 10/7747; G06V 10/82; G06V 10/454; G06F 16/2455; G06F 40/30; G06F 16/55
See application file for complete search history.

(56) References Cited

U.S. PATENT DOCUMENTS

2023/0237277 A1* 7/2023 Reza ..................... G06F 40/186
704/9

OTHER PUBLICATIONS

Sun et al NPL ("Ernie 3.0: Large-Scale Knowledge Enhanced Pre-Training for Language Understanding and Generation" Published 2021 (Total 22 pages) (Year: 2021).*
Achille et al., "Task2vec: Task embedding for meta-learning", IEEE/CVF International Conference on Computer Vision, 2019, Los Alamitos, California, pp. 6430-6439.

(Continued)

*Primary Examiner* — Quoc A Tran

(57) ABSTRACT

Systems and methods for natural language processing can leverage trained prompts to condition a large pre-trained machine-learned model to generate an output for a specific task. For example, a subset of parameters may be trained for the particular task to then be input with a set of input data into the pre-trained machine-learned model to generate the task-specific output. During the training of the prompt, the parameters of the pre-trained machine-learned model can be frozen, which can reduce the computational resources used during training while still leveraging the previously learned data from the pre-trained machine-learned model.

17 Claims, 11 Drawing Sheets

(56) References Cited

OTHER PUBLICATIONS

Aghajanyan et al., "Intrinsic Dimensionality Explains The Effectiveness Of Language Model Fine-tuning," arXiv: 2012.13255, 11 pages.
Bar-Haim et al., "The Second PASCAL Recognising Textual Entailment Challenge", In Proceedings of the Second PASCAL Challenges Workshop on Recognising Textual Entailment, vol. 7, 2006, 9 pages.
Bentivogli et al., "The Sixth PASCAL Recognizing Textual Entailment Challenge", In TAC, 2009, 18 pages.
Github, "JAX: Autograd and XLA", 2018, https://github.com/google/jax, retrieved on Jul. 15, 2022, 13 pages.
Brown et al. "Language Models Are Few-Shot Learners", Advances In Neural Information Processing Systems, vol. 33, 2020, pp. 1877-1901.
Clark et al., "BoolQ: Exploring The Surprising Difficulty Of Natural Yes/No Questions", 2019, arXiv preprint arXiv:1905.10044, 13 pages.
Dagan, "The Pascal Recognising Textual Entailment Challenge", In Machine Learning Challenges Workshop, pp. 177-190. Springer, Berlin, Heidelberg, 2005.
De Marneffe et al., "The CommitmentBank: Investigating Projection In Naturally Occurring Discourse." In Proceedings of Sinn und Bedeutung, vol. 23, No. 2, 2019, pp. 107-124.
Devlin et al., "Bert: Pre-Training Of Deep Bidirectional Transformers For Language Understanding", 2018, arXiv preprint arXiv:1810.04805, pp. 4171-4186.
Dolan et al., "Automatically Constructing A Corpus Of Sentential Paraphrases", In Third International Workshop on Paraphrasing, 2005, 8 pages.
Dua et al., "Drop: A Reading Comprehension Benchmark Requiring Discrete Reasoning Over Paragraphs", 2019, arXiv preprint arXiv:1903.00161, pp. 2368-2378.
Fisch et al., "MRQA 2019 Shared Task: Evaluating Generalization In Reading Comprehension", 2019, arXiv preprint arXiv:1910.09753, 13 pages.
Giampiccolo et al., "The Third Pascal Recognizing Textual Entailment Challenge", In Proceedings Of The ACL-PASCAL Workshop On Textual Entailment And Paraphrasing, 2007, pp. 1-9.
Graves et al., "Speech Recognition With Deep Recurrent Neural Networks", In 2013 IEEE International Conference On Acoustics, Speech And Signal Processing, 2013, pp. 6645-6649.
Hambardzumyan et al., "Warp: Word-Level Adversarial Reprogramming", 2021, arXiv preprint arXiv:2101.00121, 13 pages.
Hansen et al., "Neural Network Ensembles", IEEE Transactions On Pattern Analysis And Machine Intelligence vol. 12, No. 10, 1990, pp. 993-1001.
Houlsby et al., "Parameter-Efficient Transfer Learning For NLP", In International Conference on Machine Learning, 2019, pp. 2790-2799.
Quora, "First Quora Dataset Release: Question Pairs", 2017, https://quoradata.quora.com/First-Quora-Dataset-Release-Question-Pairs, retrieved on Jul. 15, 2022, 3 pages.
Jiang et al., "How Can We Know What Language Models Know?", Transactions of the Association for Computational Linguistics vol. 8, 2020, pp. 423-438.
Kembhavi et al., "Are You Smarter Than A Sixth Grader? Textbook Question Answering For Multimodal Machine Comprehension." In Proceedings of the IEEE Conference on Computer Vision and Pattern Recognition, 2017, pp. 4999-5007.
Khashabi et al., "Looking Beyond The Surface: A Challenge Set For Reading Comprehension Over Multiple Sentences", In Proceedings of the 2018 Conference of the North American Chapter of the Association for Computational Linguistics: Human Language Technologies, vol. 1 (Long Papers), 2018, pp. 252-262.
Kocijan et al., "A Surprisingly Robust Trick For Winograd Schema Challenge", 2019, arXiv preprint arXiv:1905.06290, pp. 4837-4842.
Kudo et al., "SentencePiece: A Simple And Language Independent Subword Tokenizer And Detokenizer For Neural Text Processing", 2018, arXiv preprint arXiv:1808.06226, pp. 66-71.
Lai et al., "Race: Large-Scale Reading Comprehension Dataset From Examinations", 2017, arXiv preprint arXiv:1704.04683, pp. 785-794.
Lakshminarayanan et al., "Simple And Scalable Predictive Uncertainty Estimation Using Deep Ensembles", Advances In Neural Information Processing Systems, vol. 30, 2017, 12 pages.
Lampinen et al., "Transforming Task Representations To Perform Novel Tasks." Proceedings of the National Academy of Sciences, vol. 117, No. 52, 2020, pp. 32970-32981.
Levesque et al., "The Winograd Schema Challenge", In Thirteenth International Conference On The Principles Of Knowledge Representation And Reasoning, 2012, 10 pages.
Levy et al., "Zero-Shot Relation Extraction Via Reading Comprehension", 2017, arXiv preprint arXiv:1706.04115 pp. 333-342.
Lewis et al., "Bart: Denoising Sequence-To-Sequence Pre-Training For Natural Language Generation, Translation, And Comprehension", 2019, arXiv preprint arXiv:1910.13461, pp. 7871-7880.
Li et al., "Prefix-Tuning: Optimizing Continuous Prompts For Generation", 2021, arXiv preprint arXiv:2101.00190, 15 pages.
Liu et al., "GPT Understands, Too", 2021, arXiv preprint arXiv:2103.10385, 10 pages.
Logeswaran et al., "Few-Shot Sequence Learning With Transformers", 2020, arXiv preprint arXiv:2012.09543, 13 pages.
Nair et al., "Rectified Linear Units Improve Restricted Boltzmann Machines", In ICML, 2010.
Peters et al., "Deep Contextualized Word Representations", In Proceedings of the 2018 Conference of the North American Chapter of the Association for Computational Linguistics: Human Language Technologies, vol. 1, 2018, pp. 2227-2237.
Pilehvar et al., "WiC: 10,000 Example Pairs For Evaluating Context-Sensitive Representations", CoRR, 2018, abs/1808.09121, 6 pages.
Radford et al., "Language Models Are Unsupervised Multitask Learners", OpenAI, Blog 1, No. 8, 2019, 24 pages.
Raffel et al., "Exploring The Limits Of Transfer Learning With A Unified Text-To-Text Transformer", J. Mach. Learn. Res. 21, No. 140, 2020, pp. 1-67.
Rajpurkar et al., "Squad: 100,000+ Questions For Machine Comprehension Of Text", 2016, arXiv preprint arXiv:1606.05250, 10 pages.
Rebuffi et al., "Learning Multiple Visual Domains With Residual Adapters", Advances In Neural Information Processing Systems, vol. 30, 2017, pp. 1-67.
Roemmele et al., "Choice of Plausible Alternatives: An Evaluation of Commonsense Causal Reasoning", In AAAI Spring Symposium: Logical Formalizations Of Commonsense Reasoning, 2011, pp. 90-95.
Saha et al., "DuoRC: Towards Complex Language Understanding With Paraphrased Reading Comprehension", 2018, arXiv preprint arXiv:1804.07927, pp. 1683-1693.
Schick et al., "Few-Shot Text Generation With Pattern-Exploiting Training", 2020, arXiv preprint arXiv:2012.11926, 13 pages.
Shazeer et al., "Glu Variants Improve Transformer", 2020, arXiv preprint arXiv:2002.05202, 5 pages.
Shazeer et al., "Adafactor: Adaptive Learning Rates With Sublinear Memory Cost", In International Conference on Machine Learning, PMLR, 2018, pp. 4596-4604.
Shin et al., "AutoPrompt: Eliciting Knowledge From Language Models With Automatically Generated Prompts", 2020, arXiv preprint arXiv:2010.15980, pp. 4222-4235.
Vaswani et al., "Attention Is All You Need." Advances In Neural Information Processing Systems, vol. 30, 2017, pp. 5998-6008.
Wang et al., "Glue: A Multi-Task Benchmark And Analysis Platform For Natural Language Understanding", 2019, arXiv preprint arXiv:1804.07461, 20 pages.
Wang et al., "SuperGlue: A Stickier Benchmark For General-Purpose Language Understanding Systems", Advances In Neural Information Processing Systems, vol. 32, 2019, 15 pages.
Zhang et al., Record: Bridging The Gap Between Human And Machine Commonsense Reading Comprehension, 2018, arXiv preprint arXiv:1810.12885, 14 pages.

(56) References Cited

OTHER PUBLICATIONS

Jia et al., "Visual Prompt Tuning", arXiv:2203.12119v1, Jul. 20, 2022, 34 pages.

* cited by examiner

PARAMETER EFFICIENT PROMPT TUNING FOR EFFICIENT MODELS AT SCALE

FIELD

The present disclosure relates generally to generating and using prompts for utilizing pre-trained machine-learned models. More particularly, the present disclosure relates to prompt tuning in order to generate prompts associated with particular tasks to enable the use of pre-trained machine-learned models without retraining the large pre-trained machine-learned model.

BACKGROUND

Some current systems can include transfer learning. Transfer learning for large pretrained models can show great results and can be state of the art on a plurality of tasks. However, transfer learning can be difficult for many people to use due to computational resources needed and parallel computing expertise. Additionally, transfer learning can require a new version of the large pre-trained model for each new task.

Prompt-based adaptation can have several drawbacks. First, task description can be error-prone and can rely on human involvement. Second, the effectiveness of the prompt can be limited by the number of conditioning examples that can fit in the model's maximum input length. Third, downstream task quality may still lag far behind that of tuned models.

SUMMARY

Aspects and advantages of embodiments of the present disclosure will be set forth in part in the following description, or can be learned from the description, or can be learned through practice of the embodiments.

One example aspect of the present disclosure is directed to a computing system for prompt tuning. The system can include one or more processors and one or more non-transitory computer-readable media that collectively store instructions that, when executed by the one or more processors, cause the computing system to perform operations. The operations can include obtaining a training dataset. The training dataset can include a plurality of training examples and a plurality of training labels for the respective training examples. The operations can include processing, with a pre-trained machine-learned model, one or more training examples of the plurality of training examples and a prompt to generate a training output. In some implementations, a plurality of pre-trained parameters for the pre-trained machine-learned model can be fixed during prompt tuning. The prompt can be associated with a particular task. In some implementations, the particular task can be associated with the one or more training examples. The operations can include determining a prompt gradient based at least in part on a comparison between the training output and one or more training labels associated with the one or more training examples and adjusting one or more prompt parameters of the prompt based on the prompt gradient.

In some implementations, the plurality of training examples can include a plurality of text datasets. The particular task can be a natural language processing task. In some implementations, the pre-trained machine-learned model can include a model adapted to generate a text prediction output for text that follows an input text. The pre-trained machine-learned model may be trained with text masking. In some implementations, the pre-trained machine-learned model can include one or more encoder blocks and one or more decoder blocks.

In some implementations, the operations can include obtaining input text data. The input text data can include one or more words. The operations can include processing the prompt and the input text data with the pre-trained machine-learned model to generate output text data. The output text data can include a plurality of text characters. In some implementations, the operations can include providing the output text data as an output. The operations can include storing the prompt in a prompt database. The prompt database can include a plurality of prompts associated with a plurality of different tasks.

In some implementations, the prompt can be configured to be input with input data to the pre-trained machine-learned model to generate output data associated with the particular task. The particular task can include determining whether the input data comprises content associated with a positive intent. The prompt can be configured to be input with input data to the pre-trained machine-learned model to generate output data associated with the particular task. The input data can include visual data, and the visual data can include one or more images. In some implementations, the prompt can be configured to be input with input data to the pre-trained machine-learned model to generate output data associated with the particular task. The output data can include output visual data, and the output visual data can include one or more images generated based at least in part on the input data and the prompt.

Another example aspect of the present disclosure is directed to a computer-implemented method for using a tuned prompt. The method can include obtaining, by a computing system including one or more processors, input data. The method can include obtaining, by the computing system, a prompt. The prompt can include one or more learned parameters associated with a particular task. The method can include processing, by the computing system, the input data and the prompt with a pre-trained machine-learned model to generate output data. In some implementations, the output data can be associated with the particular task associated with the prompt. The prompt and the pre-trained machine-learned model can be trained separately. The method can include providing, by the computing system, the output data as an output.

In some implementations, the pre-trained machine-learned model can include a generative pre-trained transformer model. The pre-trained machine-learned model can include an autoregressive language model. In some implementations, the pre-trained machine-learned model may have been originally trained with text masking and was re-trained for auto-completion. The prompt can prime the pre-trained machine-learned model for the particular task.

Another example aspect of the present disclosure is directed to one or more non-transitory computer-readable media that collectively store instructions that, when executed by one or more computing devices, cause the one or more computing devices to perform operations. The operations can include obtaining input data and one or more selections from a user. The one or more selections can be associated with a particular task. The operations can include obtaining a prompt based on the one or more selections. In some implementations, the prompt can include one or more learned parameters associated with the particular task. The operations can include processing the input data and the prompt with a pre-trained machine-learned model to generate output data. The pre-trained machine-learned model can be conditioned by the prompt to generate output data associated with the particular task. The operations can include providing the output data as an output to the user.

In some implementations, the operations can include obtaining a second prompt. The second prompt can be associated with a second task. The operations can include processing the input data and the second prompt with the pre-trained machine-learned model to generate second output data and providing second output data to the user. In some implementations, the particular task can include a classification task, and the output data can include text descriptive of a particular classification associated with the input data. The prompt can be generated by learning the one or more learned parameters by processing training data with the pre-trained machine-learned model, and the parameters of the pre-trained machine-learned model can be fixed during learning. In some implementations, the prompt can include less than one one-hundredth of a percentage of a number of parameters of the pre-trained machine-learned model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
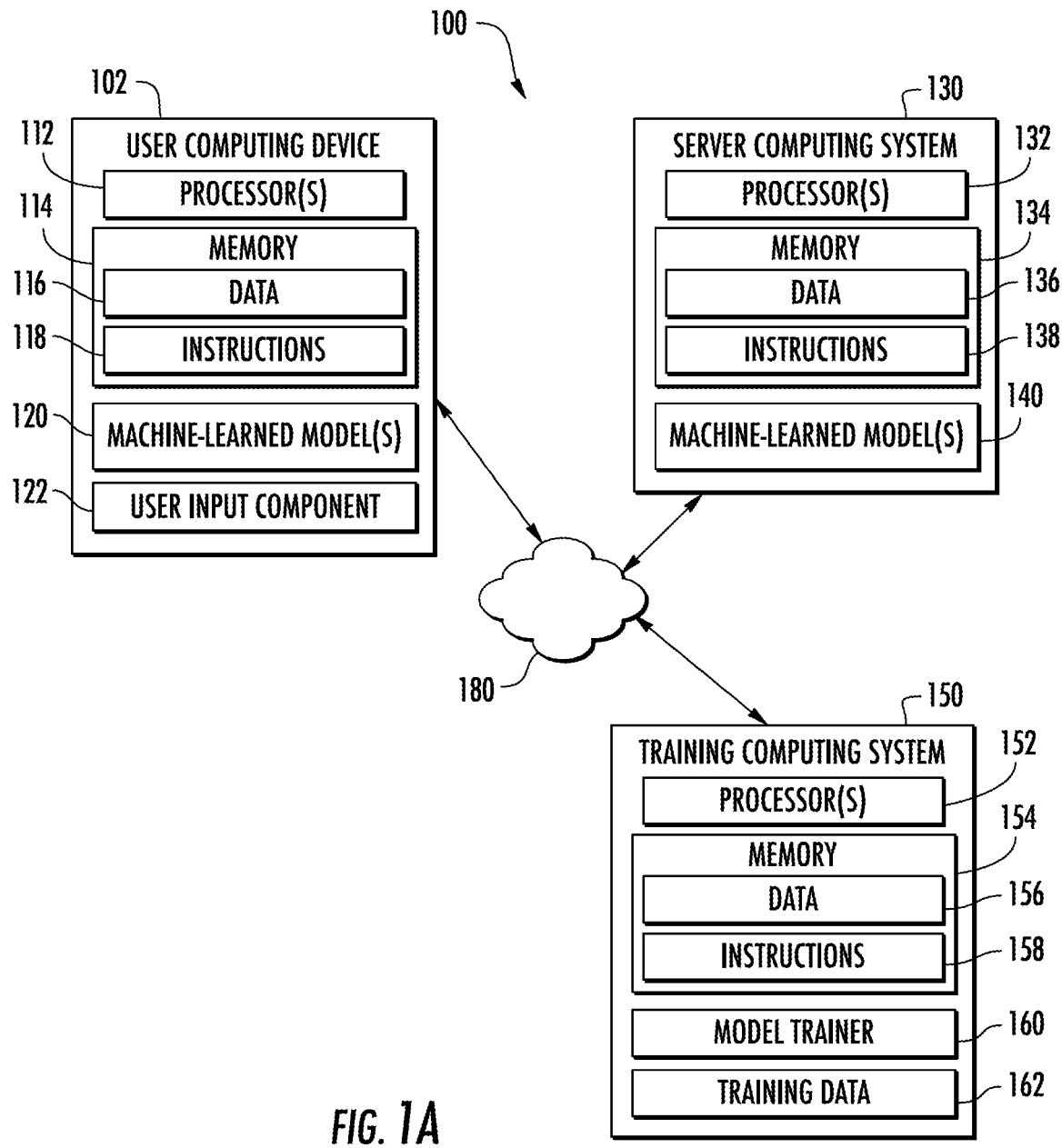
FIG. 1A depicts a block diagram of an example computing system that performs prompt tuning according to example embodiments of the present disclosure.

Reference numerals that are repeated across plural figures are intended to identify the same features in various implementations.

DETAILED DESCRIPTION

Overview

Generally, the present disclosure is directed to training and utilizing soft prompts for conditioning task performance of pre-trained machine-learned models. For example, the systems and methods disclosed herein can prompt tune in order to train prompts, which can be input with input model to condition a large pre-trained model to perform a specific task. In particular, one particular use can involve inputting the learned prompt and a set of input text into a large pre-trained language model in order to obtain an output that accurately reflects the desired task of the user without having to retrain the model for the specific natural language processing task. For example, the systems and methods can include obtaining a training dataset. In some implementations, the training dataset can include a plurality of training examples and a plurality of training labels for the respective training examples. One or more training examples of the plurality of training examples and a prompt can be processed with a pre-trained machine-learned model to generate a training output. In some implementations, the plurality of pre-trained parameters for the pre-trained machine-learned model can be fixed during prompt tuning. The prompt can be associated with a particular task, and the particular task can be associated with the one or more training examples. A prompt gradient can be determined based at least in part on a comparison between the training output and one or more training labels associated with the one or more training examples. The systems and methods can include adjusting one or more prompt parameters of the prompt based on the prompt gradient. The prompt can be trained for a particular task associated with the one or more training examples and the one or more training labels such that the prompt is configured to be input with input data to the pre-trained machine-learned model to generate output data associated with the particular task.

In some implementations, a training dataset can be obtained. The training dataset can include a plurality of training examples and a plurality of training labels for the respective training examples. In some implementations, the plurality of training examples can include a plurality of text datasets. The particular task can be a natural language processing task. In some implementations, the training dataset can include a plurality of text examples and a plurality of classifications associated with the plurality of text examples. Alternatively and/or additionally, the training dataset can include a plurality of visual examples (e.g., a plurality of images) and a plurality of classifications (e.g., object classifications in an image, an image classification, a semantic classification, etc.) associated with the plurality of visual examples.

The systems and methods can include processing one or more training examples of the plurality of training examples with a pre-trained machine-learned model to generate a training output (e.g., a classification output, a detection output, a completion output, an augmentation output, etc.). In some implementations, the pre-trained machine-learned model can process the one or more training examples and a prompt. The plurality of pre-trained parameters for the pre-trained machine-learned model can be fixed during prompt tuning (e.g., the pre-trained machine-learned model can be frozen such that the parameters are not adjusted during training of the prompt parameters). In some implementations, the pre-trained machine-learned model can include a model adapted to generate a text prediction output for text that follows an input text (e.g., the input text can include "the sky is" and the output can be "blue"). Alternatively and/or additionally, the pre-trained machine-learned model may have been trained with text masking (e.g., the input text can include "The man old" and the output can be "is"). The pre-trained machine-learned model can include one or more encoder blocks and one or more decoder blocks. For example, the pre-trained machine-learned model can include an encoder-decoder model such as a transformer model.

A prompt gradient can then be determined based at least in part on a comparison between the training output and one or more training labels associated with the one or more training examples. In some implementations, the prompt gradient can be determined by evaluating a loss function that is evaluated based on a difference between the training output and the one or more training labels. The loss function can include a perceptual loss or another loss function. In some implementations, the labels can include ground truth outputs for the respective training examples.

One or more prompt parameters of a prompt can then be adjusted based on the prompt gradient. In some implementations, the prompt can be trained for a particular task associated with the one or more training examples and the one or more training labels such that the prompt is configured to be input with input data to the pre-trained machine-learned model to generate output data associated with the particular task. The particular task can include determining whether the input data comprises content associated with a positive intent. In some implementations, the input data can include visual data. The visual data can include one or more images. In some implementations, the output data can include output visual data, and the output visual data can include one or more images generated based at least in part on the input data and the prompt.

In some implementations, the particular task can include a classification task (e.g., a text classification task, a syntactical classification task, or a sentiment analysis task that classifies whether the input text has a positive sentiment or a negative sentiment). Alternatively and/or additionally, the particular task can include determining a response and/or a follow-up to the input text. For example, the output may be a predicted answer or generated response to an input open ended question. Alternatively and/or additionally, the output may include an augmented version of the input data, which can include correcting data or adjusting data based on the specific task or training dataset. The particular task may include a translation task.

In some implementations, prompt tuning can involve inputting parameters with the input data into the frozen model such that only those parameters are updated. Additionally and/or alternatively, the systems and methods may involve only training an initial learnable layer that either precedes the pre-trained machine-learned model or is an initialization layer of the pre-trained machine-learned model. Therefore, only the initial block (e.g., a small set of parameters at the beginning) may be written and/or overwritten, not the entire model. In some implementations, prompt tuning can include learning vectors for new words and tasks. The parameters may be learned directly based on the label comparison. The prompts can include a plurality of values and/or functions.

Additionally and/or alternatively, the prompt training can include training the model conditioned by the prompt to output the label. In some implementations, the prompt training can include training the model conditioned by the prompt to output the most probable label. Training can involve a perceptual loss and/or a variety of other losses.

In some implementations, the pre-trained machine-learned model can include a transformer model (e.g., a T5 model or a BERT model). The pre-trained machine-learned model can output text that is descriptive of a class in response to receiving the prompt and the input data. In some implementations, the pre-trained machine-learned model can include an encoder-decoder model. The encoder-decoder model of the pre-trained machine-learned model can be built on top of to adapt the model for the system. For example, the pre-trained machine-learned model can include a large language model pre-trained with mask training. The model can then be adapted by retraining with a large chunk of text to guess what comes next. The training can involve span-corruption and sentinel markers.

The systems and methods can include storing the prompt in a prompt database. The prompt database can include a plurality of prompts associated with a plurality of different tasks. The prompt and the respective task may be paired for storage such that the association can be utilized for obtaining the prompt based on a selection by a user of a desired task.

Additionally and/or alternatively, the systems and methods can include obtaining input text data, processing the prompt and the input text data with the pre-trained machine-learned model to generate output text data, and providing the output text data as an output. In some implementations, the input text data can include one or more words. The output text data can include a plurality of text characters (e.g., a text response, a text classification, a text completion, and/or a text augmentation).

Alternatively and/or additionally, the systems and methods can include obtaining input data (e.g., a set of text, audio data, visual data, and/or latent encoding data). A prompt can be obtained. In some implementations, the prompt can include one or more learned parameters associated with a particular task. The input data and the prompt can be processed with a pre-trained machine-learned model to generate output data. The output data can be associated with the particular task associated with the prompt. The prompt and the pre-trained machine-learned model may have been trained separately. The output data can then be provided as an output (e.g., provided for display in a user interface).

More specifically, the systems and methods can include obtaining input data and a prompt. The prompt can include one or more learned parameters associated with a particular task. In some implementations, the prompt can prime a pre-trained machine-learned model for the particular task. The prompt may be a prompt obtained from a prompt database based on one or more user selections. Additionally and/or alternatively, the prompt may be a prompt generated based on a training dataset that includes a plurality of training examples and a plurality of respective labels. In some implementations, the input data can include text data, image data, video data, audio data, and/or latent encoding data.

The systems and methods can include processing the input data and the prompt with a pre-trained machine-learned model to generate output data. The output data can be associated with the particular task associated with the prompt. In some implementations, the prompt and the pre-trained machine-learned model may be trained separately. Additionally and/or alternatively, the pre-trained machine-learned model can include a generative pre-trained transformer model. The pre-trained machine-learned model can include an autoregressive language model. In some implementations, the pre-trained machine-learned model may be originally trained with text masking and may be re-trained for auto-completion.

The output data can then be provided as output. The output data can include text data, image data, video data, audio data, and/or latent encoding data. The output data can be provided via a user interface. For example, text data descriptive of a classification may be provided in the display of a graphical user interface.

Alternatively and/or additionally, the systems and methods can obtain input data and one or more selections from a user. The one or more selections can be associated with a particular task. In some implementations, the particular task can include a classification task. The output data can include text descriptive of a particular classification associated with the input data. The input data can include text data, image data, video data, and/or latent encoding data. In some implementations, the one or more selections can include one or more selections to a graphical user interface. The one or more selections can be selections that select an element associated with the particular task (e.g., a graphical icon descriptive of the task).

A prompt can then be obtained based on the one or more selections. The prompt can include one or more learned parameters associated with the particular task. In some implementations, the prompt may have been generated by learning the one or more learned parameters by processing training data with the pre-trained machine-learned model. The parameters of the pre-trained machine-learned model can be fixed during learning. The prompt can include less than one one-hundredth of a percentage of a number of parameters of the pre-trained machine-learned model. In some implementations, the prompt can be obtained from a prompt database by searching the database for prompts associated with the selected task.

In some implementations, the input data and the prompt can be processed with a pre-trained machine-learned model to generate output data. The pre-trained machine-learned model can be conditioned by the prompt to generate output data associated with the particular task. The output data can include text data (e.g., one or more words), image data (e.g., one or more images), video data (e.g., one or more videos), audio data (e.g., sound wave data), and/or latent encoding data (e.g., one or more latent representations).

The output data can then be provided as an output to the user. The output data may be generated by a server computing system and may then be transmitted to a user computing system. In some implementations, the output data may be provided via one or more output components of a user computing system.

Additionally and/or alternatively, the systems and methods can include obtaining a second prompt, processing the input data and the second prompt with the pre-trained machine-learned model to generate second output data, and providing second output data to the user. The second prompt can be associated with a second task.

The use of multiple prompts to produce multiple outputs for multiple tasks can be part of prompt ensembling. The prompt ensembling can be completed for any number of prompts. The outputs can then be selected or weighted post generation. Additionally and/or alternatively, prompt ensembling can include pairing the inputs with each prompt of the plurality of prompts and passing all of the pairs through the large frozen pre-trained machine-learned model such that there is at least one output for each prompt. A particular output can be selected based on a preferred prompt or based on a prompt that has the highest correlation to the desired task. In some implementations, the output with the highest confidence score may be provided. Alternatively and/or additionally, a portion of the outputs may be weighted and provided as a weighted output. In some implementations, the plurality of prompts utilized can include a plurality of prompts for the same or similar tasks. The prompts may have been trained with varying training datasets. Prompt ensembling can enable the weighting of a plurality of outputs to get a generalized output. Alternatively and/or additionally, a specific output can be selected based on the highest confidence score, based on repeated outputs, and/or based on a hierarchy of prompts.

Alternatively and/or additionally, the systems and methods can enable a large frozen model to be used to generate respective outputs for many different tasks. Input data can be paired with a plurality of different prompts associated with a plurality of different tasks. The plurality of pairs can be processed with the large frozen model to generate a plurality of outputs. The plurality of outputs can be descriptive of outputs associated with a plurality of different tasks. Therefore, the systems and methods disclosed herein can process input data with the plurality of different prompts to obtain a large amount of data related to the input data. For example, an image can be processed with a plurality of prompts to output data descriptive of image segmentations, image classifications, object classifications, object detections, semantic analysis, etc.

Large pre-trained language models, which are continuing to grow in size, can achieve state-of-art results on many natural language processing (NLP) benchmarks. Since the development of GPT (generative pre-trained transformer) and BERT (bidirectional encoder representations from transformers), other systems may fine-tune the models on downstream tasks, which can involve adjusting every weight in the network (i.e., model tuning). However, as models become larger, storing and serving a tuned copy of the model for each downstream task can become more difficult.

However, the systems and methods may share across all downstream tasks a single frozen pre-trained language model, in which all weights are fixed. A user can prime the model for a given task through prompt design (i.e., hand-crafting a text prompt with a description or examples of the task at hand). For instance, to condition a model for sentiment analysis, one can attach the prompt, "Is the following movie review positive or negative?" before the input sequence, "This movie was amazing!"

Sharing the same frozen model across tasks can simplify serving and can allow for efficient mixed-task inference; however, this can be at the expense of task performance. Text prompts can rely on manual effort to design, and even well-designed prompts may underperform compared to model tuning.

However, prompt tuning can be a more efficient and effective method for conditioning frozen models using tunable soft prompts. Similar to engineered text prompts, soft prompts can be concatenated to the input text. Rather than selecting from existing vocabulary items, the "tokens" of the soft prompt can be learnable vectors. The configuration can lead a soft prompt to be optimized end-to-end over a training dataset. In addition to removing the need for manual design, the prompt tuning can allow the prompt to condense information from datasets containing thousands or millions of examples.

To create a soft prompt for a given task, the system may first initialize the prompt as a fixed-length sequence of vectors (e.g., 20 tokens long). In some implementations, the systems and methods can attach these vectors to the beginning of each embedded input and feed the combined sequence into the model. Alternatively and/or additionally, the systems and methods can put the prompts at different parts of the input and analyze the effect of the different positions. The model's prediction can be compared to the target to calculate a loss, and the error can be back-propagated to calculate gradients, however the system may only apply these gradient updates to our new learnable vectors—keeping the core model frozen. While soft prompts learned in this way may not be immediately interpretable, at an intuitive level, the soft prompt can be extracting evidence about how to perform a task from the labeled dataset, performing the same role as a manually written text prompt, but without the need to be constrained to discrete language.

Practical hyperparameter settings for the system can include a large learning rate (0.3), which can be important for achieving good results.

Since soft prompts may have a small parameter footprint (the system may train prompts with as few as 512 parameters), one can easily pass the model a different prompt along with each input example. This can enable mixed-task inference batches, which can streamline serving by sharing one core model across many tasks.

When evaluated on SuperGLUE and using a frozen T5 model, prompt tuning can significantly outperform prompt design using either GPT-3 or T5. Furthermore, as model size increases, prompt tuning can catch up to the performance level of model tuning. Intuitively, the larger the pre-trained model, the less of a "push" the model needs to perform a specific task, and the more capable the model may be capable of being adapted in a parameter-efficient way.

The effectiveness of prompt tuning at large model scales can be especially important, since serving separate copies of a large model can incur significant computational overhead.

Another advantage of prompt tuning can be prompt tuning's resilience to domain shift. Since model tuning touches every weight in the network, model tuning can have the capacity to easily overfit on the provided fine-tuning data and may not generalize well to variations in the task at inference time. By comparison, the learned soft prompts of the systems and methods disclosed herein can have a small number of parameters, such that the solutions they represent may be more generalizable.

To test generalizability, the system can train prompt tuning and model tuning solutions on one task and can evaluate zero-shot on a closely related task.

The systems and methods of the present disclosure provide a number of technical effects and benefits. As one example, the system and methods can be utilized to learn a plurality of soft prompts for a plurality of different tasks. The different soft prompts can be paired with their respective task to allow for conditioning pre-trained machine-learned models for specific tasks by selecting a particular soft prompt.

Another example technical effect and benefit relates to improved computational efficiency and improvements in the functioning of a computing system. For example, a technical benefit of the systems and methods of the present disclosure is the ability to reduce the computational resources needed for training and using a pre-trained machine-learned model system. In particular, prompt tuning can allow for the circumvention of retraining the full pre-trained machine-learned model. The systems and methods disclosed herein can allow for the focused training of only a subset of parameters for the specific task. For example, instead of retraining the parameters of a model for each new task, the systems and methods disclosed herein can train a prompt for each task, in which each of the plurality of prompts can individually and/or in combination be input into the same pre-trained machine-learned model to generate an output specific for the task. Therefore, instead of having to train billions of parameters of a model for each new task, a user can train tens of thousands of parameters of a soft prompt which can then utilize the billions of pre-trained parameters of the pre-trained machine-learned model.

With reference now to the Figures, example embodiments of the present disclosure will be discussed in further detail.

Example Devices and Systems

FIG. 1A depicts a block diagram of an example computing system 100 that performs prompt tuning according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more pre-trained machine-learned models 120. For example, the pre-trained machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example pre-trained machine-learned models 120 are discussed with reference to FIGS. 2-3 & 5.

In some implementations, the one or more pre-trained machine-learned models 120 can be received from the server computing system 130 over network 180, stored in the user computing device memory 114, and then used or otherwise implemented by the one or more processors 112. In some implementations, the user computing device 102 can implement multiple parallel instances of a single pre-trained machine-learned model 120 (e.g., to perform parallel output generation across multiple instances of inputs of input data and prompts).

More particularly, the pre-trained machine-learned model can be frozen during the determination of one or more prompt parameters. The pre-trained machine-learned model can then be primed by the generated prompt for specific task performance.

Additionally or alternatively, one or more pre-trained machine-learned models 140 can be included in or otherwise stored and implemented by the server computing system 130 that communicates with the user computing device 102 according to a client-server relationship. For example, the pre-trained machine-learned models 140 can be implemented by the server computing system 140 as a portion of a web service (e.g., a prompt tuning service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned pre-trained machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-3 & 5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss can be backpropagated through the model(s) to update one or more parameters of the model(s) (e.g., based on a gradient of the loss function). Various loss functions can be used such as mean squared error, likelihood loss, cross entropy loss, hinge loss, a ranking loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the pre-trained machine-learned models 120 and/or 140 based on a set of training data 162. The training data 162 can include, for example, the pre-trained machine-learned model can be pre-trained on one or more large datasets. In some implementations, the training data 162 can include a plurality of training examples and a plurality of respective labels. Additionally and/or alternatively, the pre-training can include text masking, and the re-training can include sentinel training. The training data can include text data, image data, video data, audio data, and/or latent encoding data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
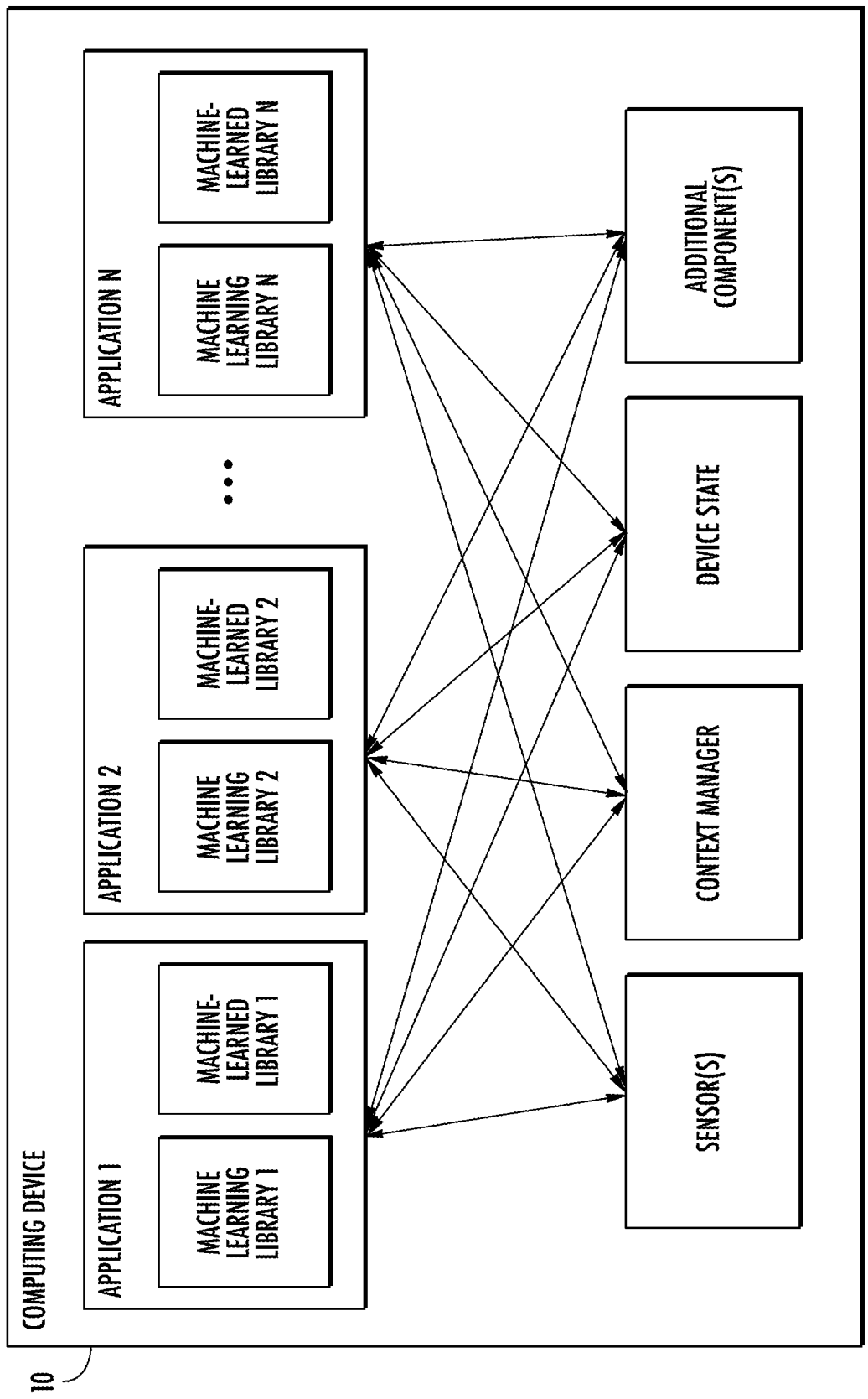
FIG. 1B depicts a block diagram of an example computing device that performs prompt tuning according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
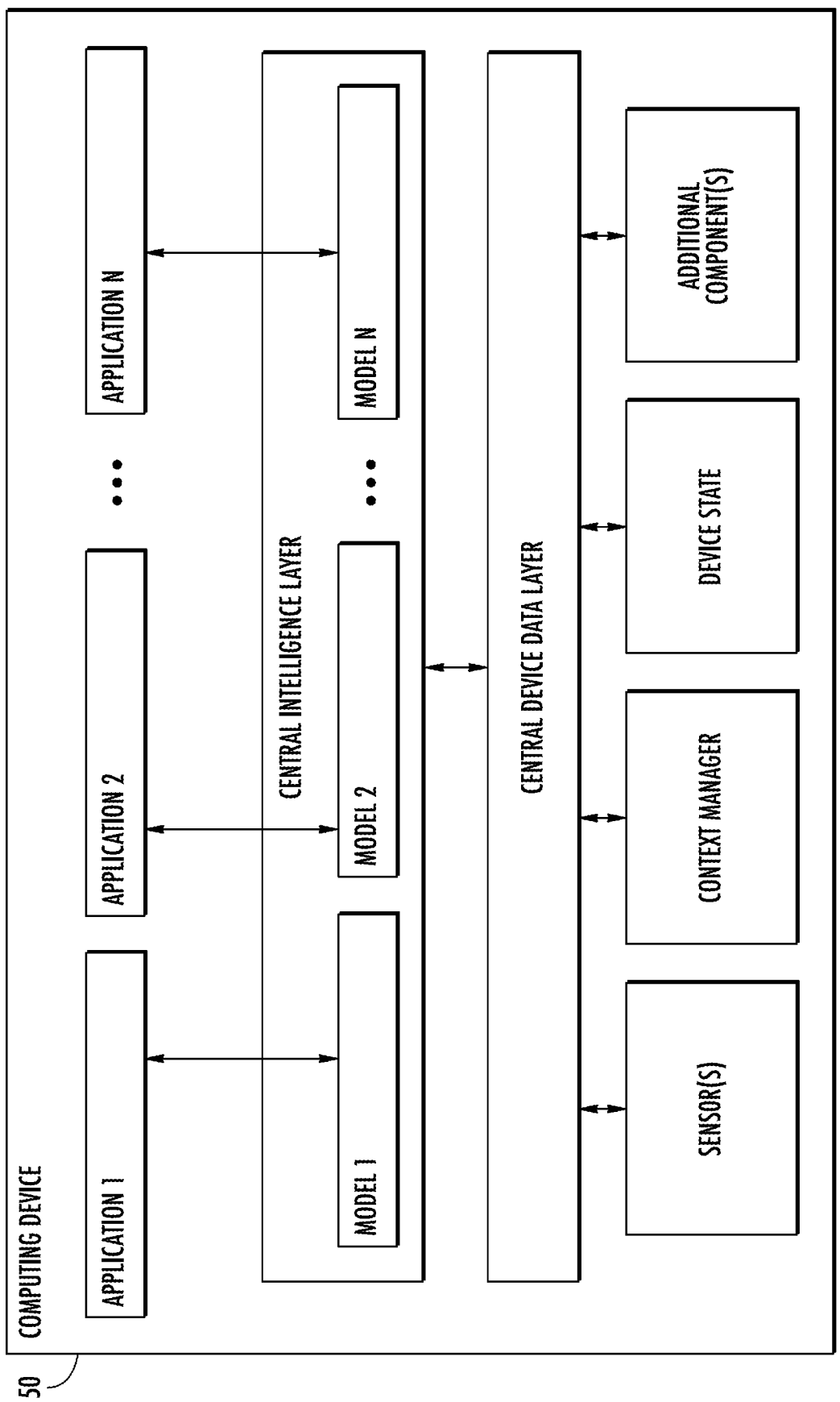
FIG. 1C depicts a block diagram of an example computing device that performs prompt tuning according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
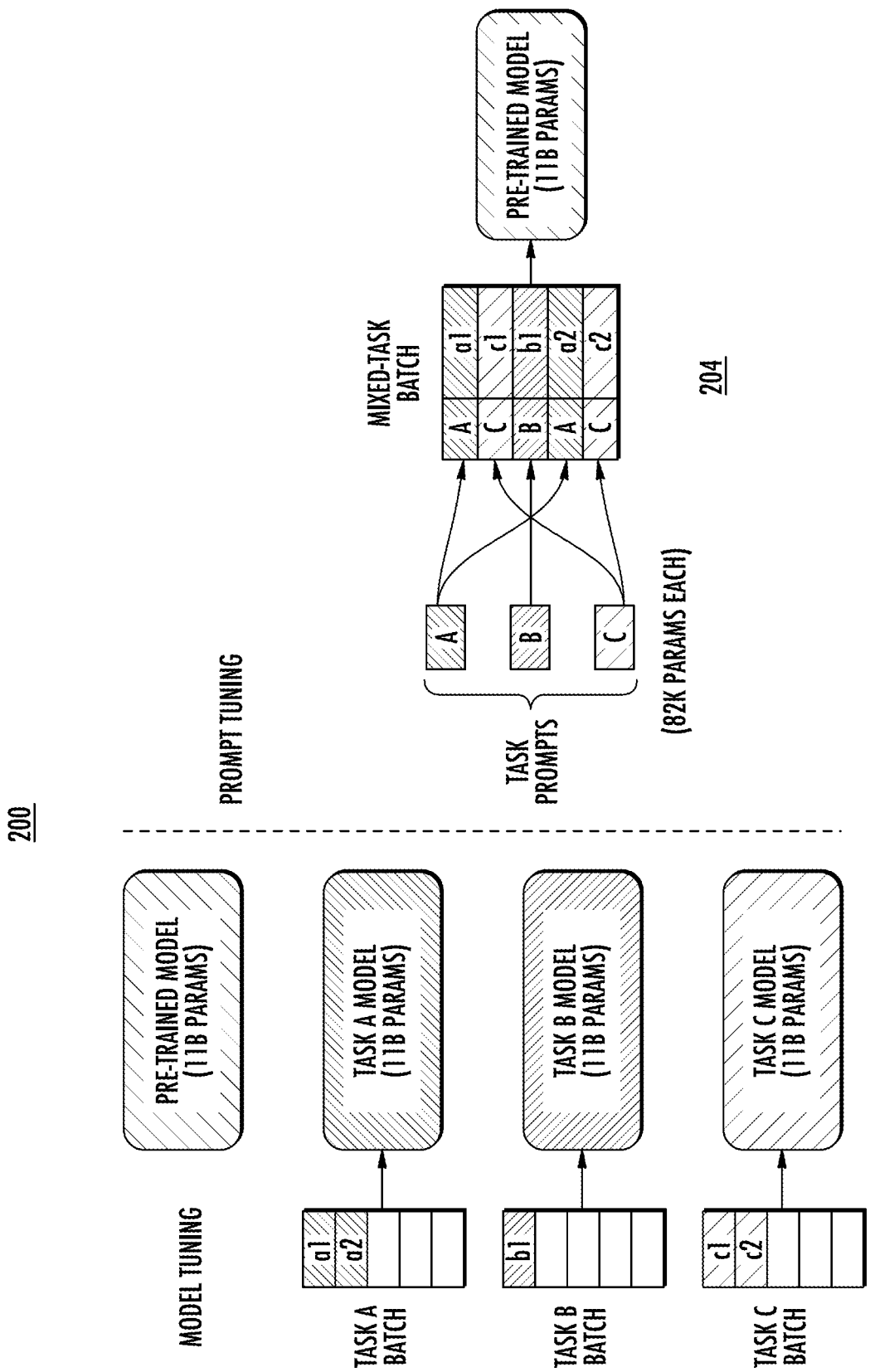
FIG. 2 depicts an illustration of an example model tuning and prompt tuning system doing multi-task inference according to example embodiments of the present disclosure.

FIG. 2 depicts an illustration of an example model tuning system and an example prompt tuning system according to example embodiments of the present disclosure. As depicted, model tuning 202 can include retraining a machine-learned model for each task. As current language models may include billions of parameters, the process of training and/or the process of retraining can be both time consuming and computationally taxing. Such processing may not be able to be performed on devices with limited computational resources. Additionally and/or alternatively, storing and accessing the different models can provide other potential issues.

Alternatively, prompt tuning 204 can involve "freezing," or fixing, the parameters of the pre-trained machine-learned model instead of re-training the parameters. Prompt tuning 204 can include learning a small set of parameters for each specific task (e.g., 82,000 per task), which can then be input into the pre-trained machine-learned model along with the input data in order to prime the pre-trained machine-learned model for that specific task. Therefore, prompt tuning 204 can involve training and/or adjusting a lot less parameters and may allow for a large pre-trained machine-learned model to be utilized for a variety of tasks without needing to re-train the model.

In particular, FIG. 2 can depict a comparison 200 between model tuning and prompt tuning according to example embodiments of the present disclosure. Model tuning 202 can rely on making a task-specific copy of the entire pre-trained model for each downstream task, and inference may be performed in separate batches. Prompt tuning 204 may only rely on storing a small task-specific prompt for each task and may enable mixed-task inference using the original pre-trained model. Using a T5 "XXL" model, each additional copy of the tuned model may rely on 11 billion parameters. By contrast, the tuned prompts may only rely on 81,920 parameters per task—a reduction of over five orders of magnitude—given a prompt length of 20 tokens and embedding dimension 4,096.

Figure 3:
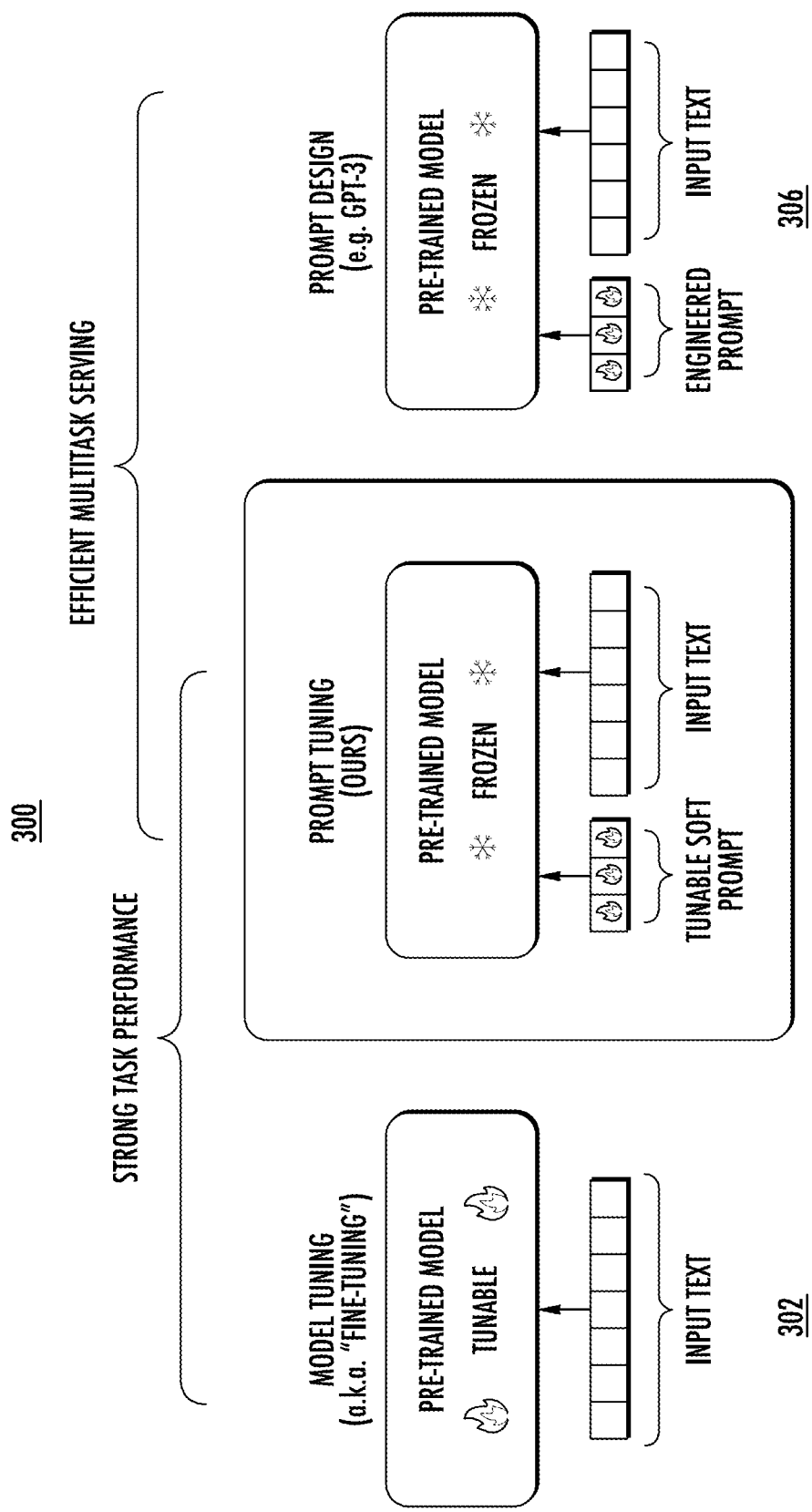
FIG. 3 depicts a block diagram of an example model tuning and prompt tuning comparison according to example embodiments of the present disclosure.

FIG. 3 depicts an illustration of an example comparison 300 according to example embodiments of the present disclosure. The comparison 300 is similar to the comparison 200 of FIG. 2 except that the comparison 300 further includes engineered prompt design 306.

In particular, prompt tuning 304 can retain the strong task performance of model tuning 302, while keeping the pre-trained model frozen, enabling efficient multitask serving. FIG. 3 can depict that although model tuning 302 can have strong task performance, model tuning 302 is computationally expensive and can require a newly trained model for each new task. Alternatively, engineered prompt design 306 (e.g., the use of several canonical examples with a task description) can allow the use of a single model for multiple tasks; however, task performance can be relatively weak due to the heavy reliance on the task description and the number of examples. However, prompt tuning 304 can utilize a single pre-trained model for a plurality of downstream tasks while maintaining strong task performance as tunable soft prompts are learned for each task in which each tunable soft prompt includes a limited number of learned parameters.

Figure 4:
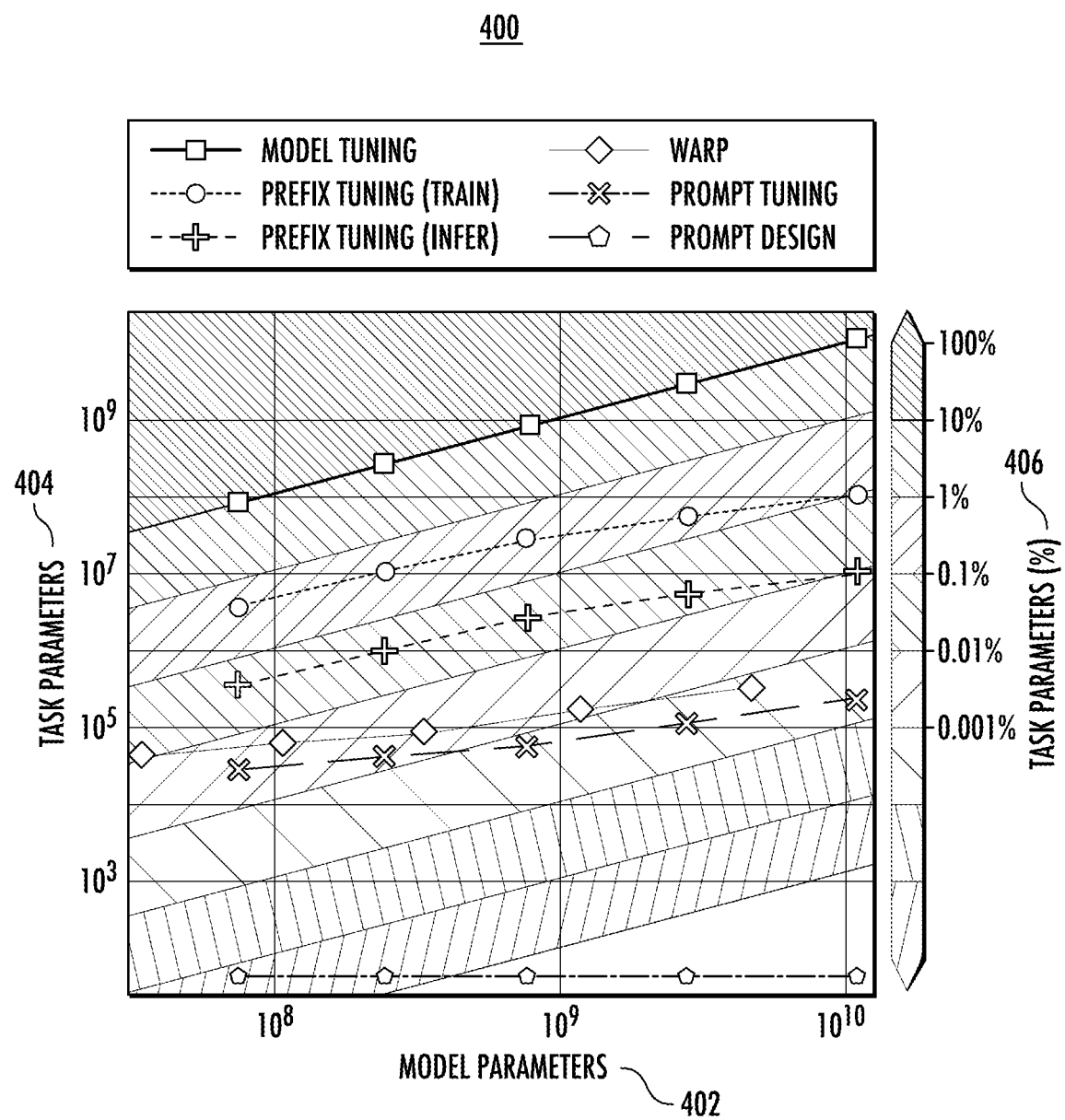
FIG. 4 depicts an illustration of an example parameter comparison according to example embodiments of the present disclosure.

FIG. 4 depicts an illustration of an example parameter comparison according to example embodiments of the present disclosure. The illustration includes results for several techniques. Each technique is trained and utilized with the task parameters 404 depicted in relation to the overall model parameters 402. Additionally, a secondary scale (i.e., task parameter percentage 406) is provided in FIG. 4 to convey the relational percentage of task parameters 404 to model parameters 402 used. As depicted, prompt tuning can utilize less parameters than the other machine-learned alternatives regardless of the model size.

In particular, FIG. 4 can depict a comparison of how many parameters worth of task-specific conditioning information may be utilized for different methods. The depicted comparison can include a fixed network architecture to T5.1.1 and fixed prefix/prompt lengths between 1-100 tokens, with bands showing mean and standard deviation. For model tuning, all parameters may be task-specific. For prefix tuning, activations can be tuned in the prefix of each network layer, resulting in between 0.1-1% task-specific parameters during inference, though more may be used in training. For WARP, task parameters may be reduced to under 0.1% by only tuning input and output layers. For prompt tuning, only prompt embeddings may be tuned, reaching under 0.01% for most model sizes. For prompt design, only a sequence of prompt IDs (500-2000 tokens) may be relied on.

Figure 5:
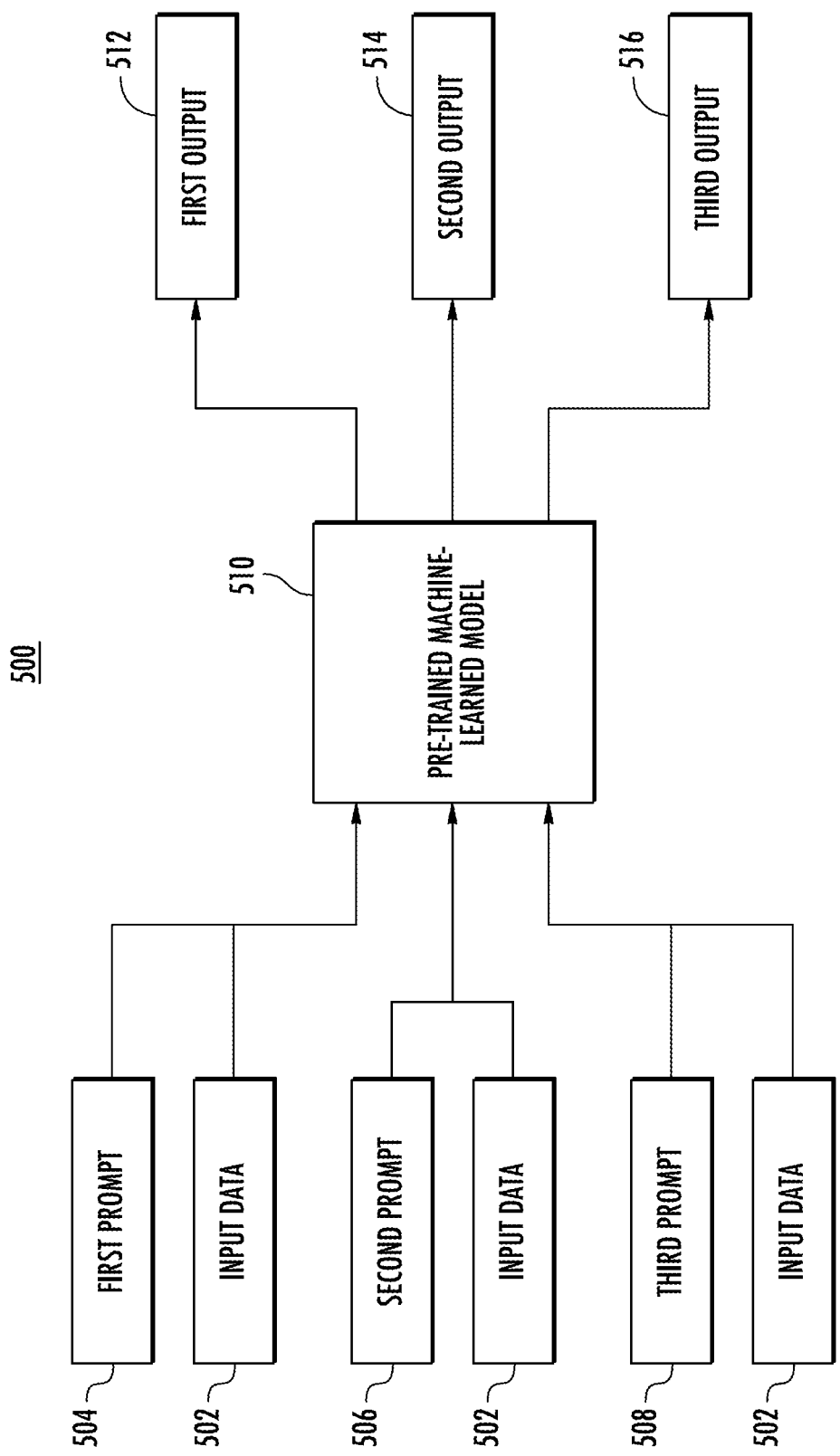
FIG. 5 depicts a block diagram of an example prompt ensembling according to example embodiments of the present disclosure.

FIG. 5 depicts a block diagram of example prompt ensembling 500 according to example embodiments of the present disclosure. In some implementations, the prompt ensembling 500 can be configured to receive input data 502 and a set of prompts 504, 506, & 508 descriptive of a set of particular tasks and, as a result of receipt of the input data 502 and the prompts 504, 506, & 508, provide output data 512, 514, & 516 that is descriptive of a task output for each respective task. Thus, in some implementations, the prompt ensembling 500 can include a pre-trained machine-learned model 510 that is operable to process the input data 502 and the prompts 504, 506, & 508 to generate the output data 512, 514, & 516.

In particular, prompt ensembling 500 can be utilized to obtain a variety of information on a dataset associated with a variety of tasks. Alternatively and/or additionally, prompt ensembling 500 can be utilized to obtain a plurality of outputs. The plurality of outputs can then be analyzed to determine a specific output to provide as a final output. In some implementations, the plurality of outputs may be weighted in order to generate the final output. The outputs may be weighted based on a task associated with the prompt used to generate the output.

Prompt ensembling 500 can include pairing a first prompt 504 with the input data 502, pairing a second prompt 506 with the input data 502, and pairing a third prompt 508 with the input data 502. Each pair can then be processed with a pre-trained machine-learned model 510 to generate an output 512, 514, & 516 for each pair. For example, the first prompt 504 and the input data 502 can be processed to generate the first output 512, the second prompt 506 and the input data 502 can be processed to generate the second output 514, and the third prompt 508 and the input data 502 can be processed to generate the third output 516.

The input data 502 can include text data, and the pre-trained machine-learned model 510 may be a large natural language processing model (e.g., a T5 model or a GPT-3 model). The first prompt 504 may be associated with a sentiment classification, which when processed can cause the pre-trained machine-learned model 510 to generate the first output 512 which is descriptive of whether the text data has a positive or negative sentiment. Additionally and/or alternatively, the second prompt 506 may be associated with a completion task, which can cause the pre-trained machine-learned model 510 to generate the second output 514 which is descriptive of additional text to supplement the input data 502. In some implementations, the third prompt 508 can be associated with a segmentation task, which can cause the pre-trained machine-learned model 510 to generate the third output 516 which is descriptive of a portion of the input text.

Figure 9:
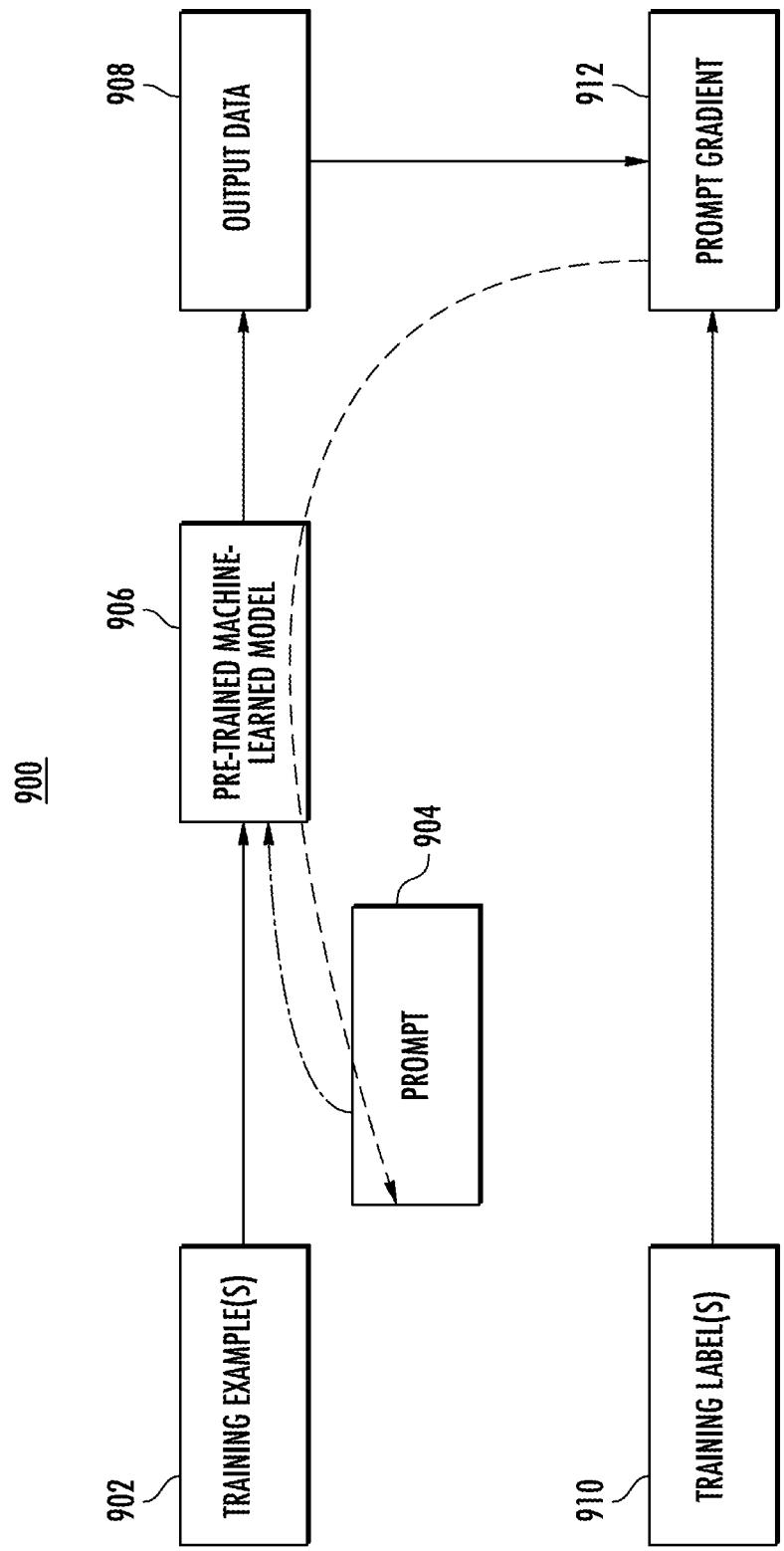
FIG. 9 depicts a block diagram of an example prompt generation system according to example embodiments of the present disclosure.

FIG. 9 depicts a block diagram of an example prompt generation system 900 according to example embodiments of the present disclosure. In some implementations, the prompt generation system 900 is configured to receive a set of one or more training examples 902 descriptive of example input data and, as a result of receipt of the one or more training examples 902, provide output data 908 that can be descriptive of a predicted output (e.g., a predicted classification, predicted additional text, predicted augmentation, predicted segmentation, etc.). Thus, in some implementations, the prompt generation system 900 can include a pre-trained machine-learned model 906 that is operable to process input data and generate the output data 908.

In particular, FIG. 9 can depict a prompt generation system 900 being utilized to tune a prompt 904 for a particular task associated with the one or more training examples 902 and the one or more respective training labels 910. For example, one or more training examples 902 may be processed by the pre-trained machine-learned model 906 to generate output data 908. The output data 908 can be compared to one or more training labels 910 associated with the one or more training examples 910 in order to determine a prompt gradient 912. The prompt gradient 912 can then be utilized to adjust one or more parameters of a prompt 904. In some implementations, the prompt 904 can be input with the one or more training examples 902 to prime the pre-trained machine-learned model 906 for a particular task. The resulting output data 908 can then be utilized to evaluate a loss function to generate a prompt gradient 912 that can be utilized to further tune the prompt 904. The prompt parameter training can involve a plurality of iterations of output generation and comparison. During such training, the parameters of the pre-trained machine-learned model 906 can remain unadjusted, or "frozen."

Example Methods

Figure 6:
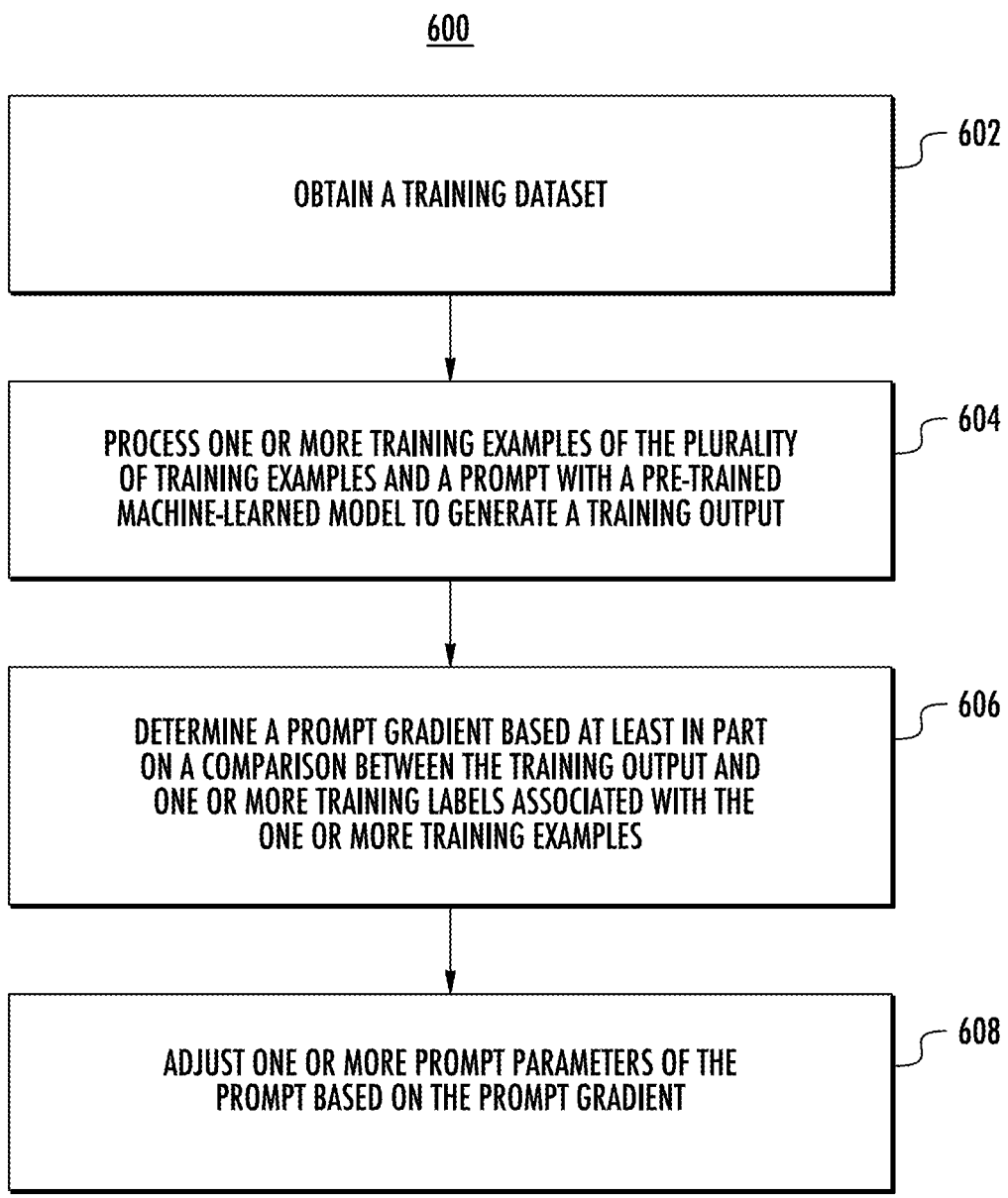
FIG. 6 depicts a flow chart diagram of an example method to perform prompt generation according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a training dataset. The training dataset can include a plurality of training examples and a plurality of training labels for the respective training examples. In some implementations, the plurality of training examples can include a plurality of text datasets. The particular task can be a natural language processing task. In some implementations, the training dataset can include a plurality of text examples and a plurality of classifications associated with the plurality of text examples. Alternatively and/or additionally, the training dataset can include a plurality of visual examples (e.g., a plurality of images) and a plurality of classifications (e.g., object classifications in an image, an image classification, a semantic classification, etc.) associated with the plurality of visual examples.

At 604, the computing system can process one or more training examples of the plurality of training examples and a prompt with a pre-trained machine-learned model to generate a training output. The plurality of pre-trained parameters for the pre-trained machine-learned model can be fixed during prompt tuning (e.g., the pre-trained machine-learned model can be frozen such that the parameters are not adjusted during training of the prompt parameters). In some implementations, the pre-trained machine-learned model can include a model adapted to generate a text prediction output for text that follows an input text (e.g., the input text can include "the sky is _____" and the output can be "blue"). Alternatively and/or additionally, the pre-trained machine-learned model may have been trained with text masking (e.g., the input text can include "The man _____ old" and the output can be "is"). The pre-trained machine-learned model can include one or more encoder blocks and one or more decoder blocks. For example, the pre-trained machine-learned model can include an encoder-decoder model such as a transformer model. The prompt can be associated with a particular task, and the particular task may be associated with the one or more training examples At 606, the computing system can determine a prompt gradient based at least in part on a comparison between the training output and one or more training labels associated with the one or more training examples. In some implementations, the prompt gradient can be determined by evaluating a loss function that is evaluated based on a difference between the training output and the one or more training labels. The loss function can include a perceptual loss or another loss function. In some implementations, the labels can include ground truth outputs for the respective training examples.

At 608, the computing system can adjust one or more prompt parameters of the prompt based on the prompt gradient. In some implementations, the prompt can be trained for a particular task associated with the one or more training examples and the one or more training labels such that the prompt is configured to be input with input data to the pre-trained machine-learned model to generate output data associated with the particular task. The particular task can include determining whether the input data comprises content associated with a positive intent. In some implementations, the input data can include visual data. The visual data can include one or more images. In some implementations, the output data can include output visual data, and the output visual data can include one or more images generated based at least in part on the input data and the prompt.

In some implementations, the particular task can include a classification task (e.g., a text classification task, a syntactical classification task, or a sentiment analysis task that classifies whether the input text has a positive sentiment or a negative sentiment). Alternatively and/or additionally, the particular task can include determining a response and/or a follow-up to the input text. For example, the output may be a predicted answer or generated response to an input open ended question. Alternatively and/or additionally, the output may include an augmented version of the input data, which can include correcting data or adjusting data based on the specific task or training dataset. The particular task may include a translation task.

Figure 7:
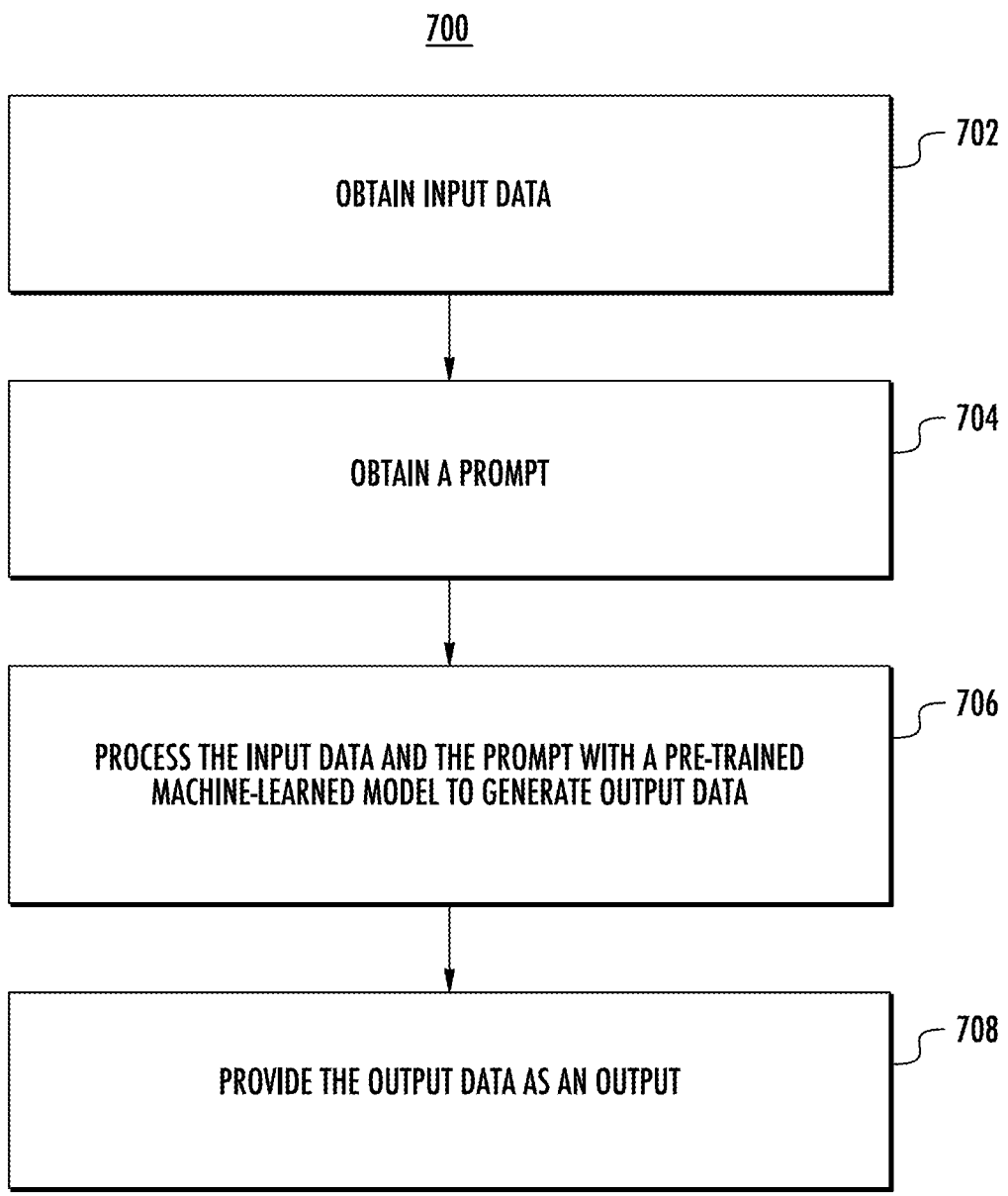
FIG. 7 depicts a flow chart diagram of an example method to perform prompt utilization according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain input data. In some implementations, the input data can include text data, image data, video data, audio data, and/or latent encoding data.

At 704, the computing system can obtain a prompt. The prompt can include one or more learned parameters associated with a particular task. In some implementations, the prompt can prime a pre-trained machine-learned model for the particular task. The prompt may be a prompt obtained from a prompt database based on one or more user selections. Additionally and/or alternatively, the prompt may be a prompt generated based on a training dataset that includes a plurality of training examples and a plurality of respective labels.

At 706, the computing system can process the input data and the prompt with a pre-trained machine-learned model to generate output data. The output data can be associated with the particular task associated with the prompt. In some implementations, the prompt and the pre-trained machine-learned model may be trained separately. Additionally and/or alternatively, the pre-trained machine-learned model can include a generative pre-trained transformer model. The pre-trained machine-learned model can include an autoregressive language model. In some implementations, the pre-trained machine-learned model may be originally trained with text masking and may be re-trained for autocompletion.

At 708, the computing system can provide the output data as an output. The output data can include text data, image data, video data, audio data, and/or latent encoding data. The output data can be provided via a user interface. For example, text data descriptive of a classification may be provided in the display of a graphical user interface.

Figure 8:
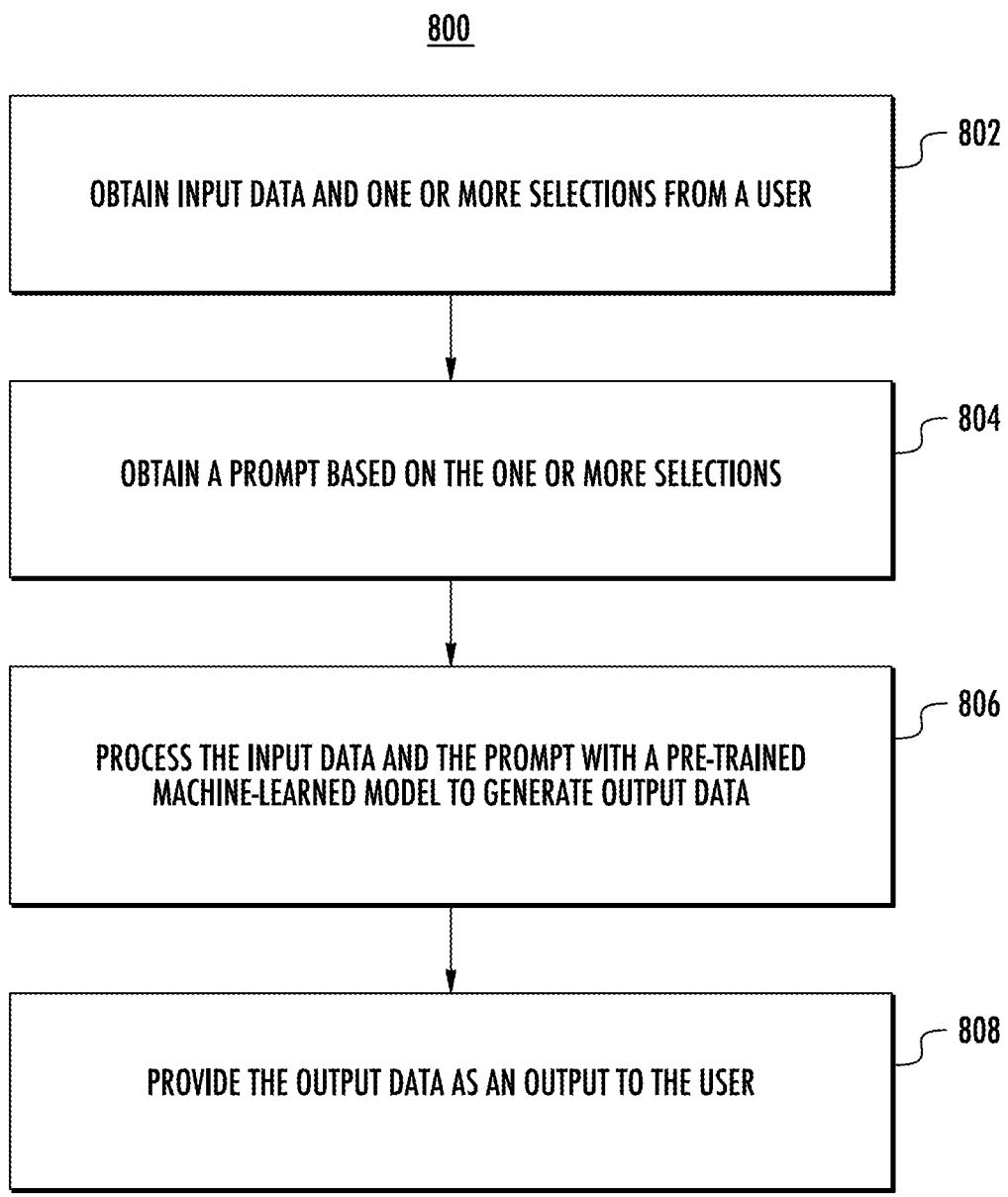
FIG. 8 depicts a flow chart diagram of an example method to perform prompt utilization according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain input data and one or more selections from a user. The one or more selections can be associated with a particular task. In some implementations, the particular task can include a classification task. The output data can include text data descriptive of a particular classification associated with the input data. The input data can include text data, image data, video data, and/or latent encoding data. In some implementations, the one or more selections can include one or more selections to a graphical user interface. The one or more selections can be selections that select an element associated with the particular task (e.g., a graphical icon descriptive of the task).

At 804, the computing system can obtain a prompt based on the one or more selections. The prompt can include one or more learned parameters associated with the particular task. In some implementations, the prompt may have been generated by learning the one or more learned parameters by processing training data with the pre-trained machine-learned model. The parameters of the pre-trained machine-learned model can be fixed during learning. The prompt can include less than one one-hundredth of a percentage of a number of parameters of the pre-trained machine-learned model. In some implementations, the prompt can be obtained from a prompt database by searching the database for prompts associated with the selected task.

At 806, the computing system can process the input data and the prompt with a pre-trained machine-learned model to generate output data. The pre-trained machine-learned model can be conditioned by the prompt to generate output data associated with the particular task. The output data can include text data (e.g., one or more words), image data (e.g., one or more images), video data (e.g., one or more videos), audio data (e.g., sound wave data), and/or latent encoding data (e.g., one or more latent representations).

At 808, the computing system can provide the output data as an output to the user. The output data may be generated by a server computing system and may then be transmitted to a user computing system. In some implementations, the output data may be provided via one or more output components of a user computing system.

Example Implementations and Experiments

Prompt tuning can be an effective mechanism for learning "soft prompts" to condition frozen language models to perform specific downstream tasks. Unlike the discrete text prompts used by GPT-3 (Ashley Pilipiszyn, *GPT-3 Powers the Next Generation of Apps*, OPENAI (Mar. 25, 2021), https://openai.com/blog/gpt-3-apps/.), soft prompts can be learned through back-propagation and can be tuned to incorporate signal from any number of labeled examples. The end-to-end learned approach disclosed herein can outperform GPT-3's "few-shot" learning by a large margin. In some implementations, prompt tuning can become more competitive with scale: as models exceed billions of parameters, the prompt tuning method can close the gap and can match the strong performance of model tuning, where all model weights are tuned. The resulting performance can be especially relevant in that large models are costly to share and serve, and the ability to reuse one frozen model for multiple downstream tasks can ease the burden. Conditioning a frozen model with soft prompts may confer benefits in robustness to domain transfer.

The systems and methods disclosed herein can utilize prompt tuning as a simplification for adapting language models. The systems and methods can freeze the entire pre-trained model and only allow an additional k tunable tokens per downstream task to be prepended to the input text. The "soft prompt" can be trained end-to-end and can condense the signal from a full labeled dataset, which can allow the systems and methods to outperform "few-shot" prompts. At the same time, because a single pre-trained model is recycled for all downstream tasks, we retain the efficient serving benefits of frozen models, as illustrated in FIG. 2.

In some implementations, the systems and methods may include prompt tuning alone with no further complexity such as intermediate-layer prefixes or task-specific output layers. Prompt tuning alone can be sufficient to be competitive with model tuning.

Explicitly separating task-specific parameters from "generalist" parameters (those needed for general language-understanding) can have a range of additional benefits. Capturing the task definition in the prompt while keeping the generalist parameters fixed can enable the systems and methods to achieve better transfer learning when adapting to new domains. Additionally and/or alternatively, prompt ensembling (e.g., learning multiple prompts for the same task) can increase quality and can be more efficient than traditional model ensembling. In some implementations, parameter factorization can allow large pre-trained models to be run efficiently as a service, allowing the provider to interleave inputs between different clients and different workloads.

The "text-to-text" approach of T5 (Adam Roberts & Colin Raffel, *Exploring Transfer Learning with T5: the Text-To-Text Transfer Transformer*, GOGGLE AI BLOG (Feb. 24, 2020), https://ai.googleblog.com/2020/02/exploring-transfer-learning-with-t5.html.) can include casting all tasks as text generation. Instead of modeling classification as the probability of an output class given some input, p(y|X), where X is a series of tokens and y is a single class label, the systems and methods can model the function as conditional generation, where Y is a sequence of tokens that represent a class label. The configuration can be a natural fit for T5, as T5 is an encoder-decoder model. T5 models classification as $p_\theta(Y|X)$, parameterized by the weights, $\theta$, of the transformers that make up its encoder and decoder.

Prompting can be the approach of adding extra information for the model to condition on during generation of Y. Normally, prompting can be completed by prepending a series of tokens, P, to the input X, such that the model maximizes the likelihood of the correct Y, $p_\theta(Y|[P;X])$, while keeping the model parameters, $\theta$, fixed. In GPT-3, the representations of the prompt tokens, $P=p_0, p_1, \ldots, p_n$, may be part of the model's embedding table, parameterized by the frozen $\theta$. Finding an optimal prompt can thus utilize the selection of prompt tokens, through either manual search or non-differentiable search methods. Prompt tuning can remove the restriction that the prompt P be parameterized by $\theta$; instead the prompt can have its own dedicated parameters $\theta_P$ that can be updated. While prompt design can involve selecting prompt tokens from a fixed vocabulary of frozen embeddings, prompt tuning can be thought of as using a fixed prompt of special tokens, where only the embeddings of these prompt tokens can be updated. The conditional generation of the systems and methods disclosed herein can include $p_{\theta;\theta_P}(Y|[P;X])$ and can be trained by maximizing the likelihood of Y via backpropagation, while only applying gradient updates to $\theta_P$.

Given a series of n tokens, $\{x_0, x_1, \ldots, x_n\}$, the T5 model can embed the tokens, forming a matrix $X_e \in \mathbb{R}^{n \times e}$ where e is the dimension of the embedding space. The soft-prompts can be represented as a parameter $P_e \in \mathbb{R}^{p \times e}$, where p is the length of the prompt. In some implementations, the prompt can then be concatenated to the embedded input forming a single matrix $[P_e; X_e] \mathbb{R}^{(p+n) \times e}$ which then flows through the encoder-decoder as normal. The models can be trained to maximize the probability of Y, but only the prompt parameters $P_e$ may be updated.

In some implementations, the prompt representation initialization can include training from scratch, using random initialization. Another option can include initializing each prompt token to an embedding drawn from the model's vocabulary. In some implementations, the soft-prompt can modulate the frozen network's behavior in the same way as textual context preceding the input, therefore, a word-like representation may serve as a good initialization spot. For classification tasks, a third option can be to initialize the prompt with embeddings that represent an enumeration of the output classes. Initializing the prompt with the embeddings of the valid target tokens can prime the model to restrict the output to the legal output classes.

Another design consideration can be the length of the prompt. The parameter cost of the method can be EP, where E is the token embedding dimension and P is the length of the prompt. The shorter the prompt, the fewer new parameters must be tuned, such that the aim can be to find a minimal length of prompt that still has strong performance.

Unlike autoregressive language models like GPT-3, the T5 models can use an encoder-decoder architecture and can be pre-trained on a span corruption objective. Specifically, T5 can be tasked with "reconstructing" masked spans in an input text string, which can be marked with unique sentinel tokens, indicated here with $\langle X \rangle$, $\langle Y \rangle$, and $\langle Z \rangle$. The target output text can include all the masked content, separated by sentinels, plus a final sentinel. For instance, from the text "Thank you for inviting me to your party last week" the system may construct a pre-training example where the input is "Thank you $\langle X \rangle$ me to your party $\langle Y \rangle$ week" and the target output is "$\langle X \rangle$ for inviting $\langle Y \rangle$ last $\langle Z \rangle$."

A T5 model pre-trained exclusively on span corruption may not see truly natural input text (free of sentinel tokens), nor has the T5 model ever been asked to predict truly natural targets. In fact, due to the details of T5's span corruption preprocessing, every pre-training target may begin with the sentinel $\langle X \rangle$. While the "unnatural" tendency to output sentinels can be overcome through fine-tuning.

Experiments may be run with T5 models in three settings. In the first case ("Span Corruption"), the system can use pre-trained T5 off-the-shelf as the frozen model, and test to what degree the system can learn prompts that result in the natural text output expected for downstream tasks. In the second case ("Span Corruption+Sentinel"), the system can use the same model, but prepend all downstream task target text with the sentinel $\langle X \rangle$, so as to more closely resemble the targets seen in pre-training. Finally, in the third case ("LM Adaptation"), the system can continue T5's self-supervised training for a small number of addition steps, but using the "prefix LM" objective given a natural text prefix as input, the model may produce the natural text continuation as output. The adaptation step can be independent of the downstream task, and can happen only once, producing a single frozen model that may be reused for prompt tuning across a variety of tasks.

Through LM adaptation, the system can be able to "quickly" transform T5 into a model more similar to GPT-3, which can output realistic text, and can be known to respond well to prompts as a "few-shot learner". Experiments can include tests with various lengths of adaptation, between 10K and 100K steps.

The frozen models can be built on top of pre-trained T5 checkpoints of all sizes (Small, Base, Large, XL, XXL). In some implementations, the systems can leverage T5 1.1 model improvements such as public checkpoints, which include a few improvements over the original T5: (i) the removal of all supervised data from pre-training, (ii) adjustments to hyperparameters $d_{model}$ and $d_{ff}$, and (iii) the use of GeGLU over ReLU activations.

The system can select an LM adapted version of T5 (trained for an additional 100K steps) (e.g., the T5 model can be adapted by continuing training of a span corruption checkpoint; however, the training may be continued with the LM objective) as the default setting for the experiments, as the results can have less variance and yield higher performing models. The experiments can involve setting the default prompt size to 100 tokens and prepend these to the embedded input. FIG. 4 can illustrate results for comparison. The results can show even much shorter prompts are viable as model size increases. The performances can be measured on the SuperGLUE benchmark (*SuperGLUE*, GLUE (Mar. 23, 2022, 9:17 PM), https://super.gluebenchmark.com/.), a collection of eight challenging language understanding tasks designed to be summarized into a single metric. The metrics can be reported on the development set associated with each dataset.

Each of our models can train on a single SuperGLUE task. There may be no multi-task setup or mixing of training data across tasks. The system can translate each SuperGLUE dataset into a text-to-text format, except that the system may omit the task names prepended to inputs indicating which SuperGLUE task an example belongs to.

The system can train the prompts for 30,000 steps with a constant learning rate of 0.3 and a batch size of 32. The best checkpoints may be selected via early stopping on the development set, where the stopping metric is either the default metric for that dataset (e.g., Accuracy for BoolQ), or the average of metrics in the cases where a dataset is evaluated on multiple metrics. The models may be trained in JAX using the Adafactor optimizer (Noam Shazeer & Mitchell Stern, *Adafactor: Adaptive Learning Rates with Sublinear Memory Cost*, ARXIV (Apr. 11, 2018), https://arxiv.org/pdf/1804.04235.pdf.) with weight decay 1e-5, $\beta_2$, decay 0.8, and parameter scaling turned off.

To compare the method against standard model tuning, the system can tune the public T5.1.1 checkpoints on Super-GLUE using the default hyperparameters specified in the T5 library ($2^{20}$ tokens per batch, learning rate 0.001, and Adafactor optimizer with pre-training parameter states restored). In some implementations, the systems can use T5's multitask fine-tuning setup to achieve a competitive baseline. In the setup, a single model may be tuned on all tasks jointly, with a text prefix indicating the task name. The performance of the model-tuned XXL baseline on the SuperGLUE dev set can be one point higher (90.3 vs. 89.3) than T5's published results on the SuperGLUE test set, supporting the view that this is a fairly strong baseline.

At the XXL size (11 billion parameters), prompt tuning can match the performance of model tuning, despite having over 20,000 times fewer task-specific parameters.

To make a rough comparison with prompt design, the system can include GPT-3 few-shot performance on the SuperGLUE dev split. While the pre-training data and model architecture differ from T5, the system can still take GPT-3 as a good representative of prompt design and observe overall trends.

The effect of prompt initialization by training models at all sizes can be abalated while fixing the rest of the hyperparameters, using a prompt length of 100. When using random initialization, the system can draw from a uniform distribution from −0.5 to 0.5. When initializing from the embeddings of sampled vocabulary items, the system can restrict the selection to only the 5,000 most "common" tokens in T5's SentencePiece vocabulary (Taku Kudo & John Richardson, *SentencePiece: A simple and language independent subword tokenizes and detokenizer for Neural Text Processing*, ARXIV (Aug. 19, 2018), https://arxiv.org/pdf/1808.06226.pdf.), which can be ordered by likelihood in the pre-training corpus. For "class label" initialization, the system can take the embedding values for the string representations of each class in the downstream task and can use them to initialize one of the tokens in the prompt. In cases where the class label is multi-token, the system can use the mean of the token embeddings. At longer prompt lengths, the system can often run out of class labels before we have initialized all of the prompt tokens. In this case, the system can fall back to the embedding initialization strategy and sample from the most common 5,000 tokens to finish filling in the prompt. T5 may treat all of the SuperGLUE tasks as classification prompts: notably, the ReCoRD (*Reading Comprehension with Commonsense Reasoning Dataset*, RECORD (Mar. 17, 2019), https://sheng-z.github.io/ReCoRD-explorer/.) and WSC datasets (Levesque et al., *WSC (Winograd Schema Challenge)*, PAPERSWITHCODE (Jul. 27, 2019), https://paperswithcode.com/dataset/wsc.) involve the generation of short, free-form text. In some implementations, the system can initialize the prompts with words related to the task, "commonsense", "reasoning", "reading", and "comprehension" for ReCoRD and "commonsense", "pronoun", and "resolution" for WSC.

At smaller model sizes, there can be large gaps between the different initializations, but once the model is scaled to XXL size, those differences can disappear.

In some implementations, the systems and methods can train prompts for each model size while varying the prompt length in {1, 5, 20, 100, 150}, while fixing the rest of the model hyperparameters. Specifically, the system can use the 100K-step LM-adapted frozen model, and class-label initialization. In some implementations, the XXL model may give strong results with a single-token prompt, suggesting that the larger the model, the less conditioning signal may be used to achieve the target behavior. Across all models, increasing beyond 20 tokens may only yield marginal gains. Going past 100 tokens can appear to be mildly detrimental for the larger models.

Pre-training objectives can have a profound effect on prompt tuning quality. T5's default "span corruption" objective can be generally not well-suited for training frozen models to be later conditioned by prompts. Intuitively, models pre-trained to read and write sentinel tokens can be hard to apply directly to tasks of reading and writing text without sentinels. Even the "workaround" of adding a sentinel to the downstream targets can have little benefit. While LM adaptation (of 100K steps) can add value across all model sizes, the largest XXL model can be the most forgiving, and can achieve strong results even with span corruption.

Prompt tuning can use a single prompt representation that is prepended to the embedded input. In addition to requiring less parameters, the approach can allow the transformer to update the intermediate-layer task representations, as contextualized by an input example. In some implementations, the systems and methods can focus on T5, and can examine changes in performance and robustness to design choices as model size increases. Prompt tuning may rely on prompts on only the encoder. Additionally and/or alternatively, the systems and methods disclosed herein may find a set of hyperparameters that do not rely on reparameterization and may be robust across SuperGLUE tasks and model sizes.

The systems and methods disclosed herein may only prepend the prompt to the beginning of the input. The systems and methods can keep the original language model frozen during prompt training. Additionally and/or alternatively, the systems and methods can represent the prompts with a simple embedding table.

Prompt tuning can be the most parameter efficient system available. For models over a billion parameters, the task-specific parameters utilized can be less than 0.01% of the pre-trained model size. For prompt design, the system can count each token ID in the prompt as a parameter and can assume a longer prompt of between 500-2000 tokens to match the GPT-3 setting.

By freezing the parameters of the core language model, prompt tuning can prevent the model from modifying the model's general understanding of language. Instead, prompt representations can indirectly modulate the representation of the input. The configuration can reduce the model's ability to overfit to a dataset by memorizing specific lexical cues and spurious correlations. The restriction can suggest that prompt tuning may help a model to be more robust to domain shifts, where the distribution of inputs can differ between training and evaluation, even though the underlying task is the same.

The prompt tuning's ability to facilitate domain transfer in a zero-shot setting can be tested. The system can train a prompt on a source dataset and can then evaluate the prompt on a target dataset that represents the same task, but in a different domain. No training may be done on the target dataset. The first experiment in domain transfer can use the two paraphrase detection datasets from GLUE. The first dataset can be the Quora Question Pairs (QQP) dataset (*Quora Question Pairs*, PAPERSWITHCODE (Jan. 26, 2017), https://paperswithcode.com/dataset/quora-question-pairs.). For the task, models can receive two questions as input, and can predict if they are "duplicates" of each other. The domain of this dataset can be web-text from the community Q&A site, Quora, and the examples can be drawn from questions asked on the site. The second dataset can be the Microsoft Research Paraphrase Corpus (MRPC) (*MRPC*

(*Microsoft Research Paraphrase Corpus*), PAPERSWITHCODE (Mar. 3, 2005), https://paperswithcode.com/dataset/mrpc.). The dataset can be similar to QQP in that a model may predict if one sentence is a rephrasing of the other, but the data can be drawn from news articles. In some implementations, the system can select the model that is to be run on the target dataset by picking the checkpoint that has the strongest performance on the validation set of the source dataset.

| Train | Eval | Tuning | Accuracy | F1 |
|---|---|---|---|---|
| QQP | MRPC | Model | 74.1 | 83.6 |
|  |  | Prompt | 88 | 84.3 |
| MRPC | QQP | Model | 73.8 | 69.7 |
|  |  | Prompt | 77.6 | 69.6 |

Table 1 can depict the performance on zero-shot cross-domain transfer between QQP duplicate question detection and MRPC paraphrase detection. When trained on QQP and evaluated zero-shot on MRPC, prompt tuning can show far better generalization than model tuning. Prompt tuning can transfer better in the opposite direction as well, reaching higher accuracy with similar F1.

Table 1 can show that training a lightweight prompt on the QQP data and evaluating on MRPC can give much better performance than the "heavyweight" approach of tuning the entire model (+13.9 accu-racy and +0.7 F1). Prompt tuning can win in the other direction as well (transferring from the smaller MRPC dataset to the larger QQP), showing a +3.8 point improvement in accuracy, while maintaining similar F1. These results can suggest that model tuning may be over-parameterized and more prone to overfit the training task, to the detriment of similar tasks in different domains.

The experiments also test the generalization capability of prompt tuning using the 2019 Machine Reading for Question Answering (MRQA) (*MRQA: Machine Reading for Question Answering*, GITHUB (Nov. 4, 2019), https://mrqa.github.io/2019/.) shared task on generalization. For this task, several different question answering datasets can be converted into a singular, extractive format. Furthermore, the datasets can be divided into in-domain and out-of-domain groups. In-domain datasets may be provided for model training, while out-of-domain validation datasets can be used to measure generalization to new domains. The model may still be completing a single task (extractive question answering), but the distributions, patterns, and domain of the input change underneath it. Beyond providing the data itself, the MRQA shared task can categorize each dataset according to the domain of the input text. In some implementations, the system can train two models on SQuAD (*The Stanford Question Answering Dataset*, GITHUB (Aug. 22, 2019), https://rajpurkar.github.io/SQuAD-explorer/.), with one using model tuning and the other using prompt tuning. After training on SQuAD, the experiment can select the best checkpoint, based on the F1 scores on the SQuAD validation set, and can evaluate it on each of the out-of-domain datasets.

|  | Dataset | Domain | F1 | | |
|---|---|---|---|---|---|
|  |  |  | Model | Prompt | Δ |
| Train | SQUAD | Wiki | 94.6 | 94.8 | +0.2 |
| Eval | TextbookQA | Book | 49.9 | 67 | +17.1 |
|  | RACE | Exam | 59.9 | 62 | +2.1 |

-continued

| Dataset | Domain | F1 | | |
|---|---|---|---|---|
|  |  | Model | Prompt | Δ |
| BioASQ | Bio | 77.4 | 79.2 | +1.8 |
| RE | Wiki | 88.4 | 89 | +0.6 |
| DuoRC | Movie | 68.9 | 68.4 | −0.4 |
| DROP | Wiki | 68.9 | 67.8 | −1.1 |
| Average |  |  |  | +3.3 |

Table 2 can depict model results for the models trained on SQuAD, evaluated on the out-of-domain datasets from the MRQA 2019 shared task in a zero-shot fashion. Table 2 can depict that prompt tuning has stronger zero-shot performance than model tuning. The datasets where model tuning has an advantage are some of the smallest domain transfers (e.g., Wikipedia to Wikipedia), while prompt tuning really shines on large domain shifts like TextbookQA (*Textbook Question Answering (TQA)*, ALLEN INSTITUTE FOR AI (2017), https://allenai.org/data/tqa.).

In Table 2, the results can show that prompt tuning gives stronger zero-shot performance than model tuning on the majority of out-of-domain datasets, with a remarkable 17.1 point gap in F1 scores between the two approaches on TextbookQA. Of the out-of-domain datasets where model tuning is better, the results can show that DROP (Dua et al., *DROP: A Reading Comprehension Benchmark Requiring Discrete Reasoning Over Paragraphs*, ARXIV (Apr. 16, 2019), https://arxiv.org/pdf/1903.00161.pdf.) shares a domain (Wikipedia) with SQuAD and is thus one of the smallest domain transfers. In transfers with larger domain shifts (e.g., to Biomedical in BioASQ (Tsatsaronis et al., *BioASQ* (*Biomedical Semantic Indexing and Question Answering*), PAPERWITHCODE (2015), https://paperswithcode.com/dataset/bioasq.) or to Textbooks in TextbookQA, the results can show larger gains from prompt tuning. Interestingly, Table 2 can show that the prompt tuned model has stronger performance on the SQuAD development set for both exact match (+0.9) and F1 (+0.2). This can suggest that prompt tuning is better able to learn the essential task at hand without overfitting.

Ensembles of neural models trained from different initializations on the same data can be observed to improve task performance and can be useful for estimating model uncertainty. However, as model size increases, ensembling can become impractical. Beyond the space required to store N models (e.g., 42 GiB for each copy of T5-XXL), there can be a substantial inference cost to running N distinct models, whether in parallel or in series.

Prompt tuning can provide a more efficient way to ensemble multiple adaptations of a pre-trained language model. By training N prompts on the same task, the system can create N separate "models" for a task, while still sharing the core language modeling parameters throughout. Beyond drastically reducing storage costs, the prompt ensemble can make inference more efficient. To process one example, rather than computing forward passes of N different models, the system can execute a single forward pass with a batch size of N, replicating the example across the batch and varying the prompt. These savings can mirror those seen for multi-tasking in FIG. 2.

| Dataset | Metric | Avg. | Best | Ensemble |
|---|---|---|---|---|
| BoolQ | Acc. | 91 | 91.2 | 91.6 |
| COPA | Acc. | 97.2 | 98 | 99 |
| CB | Acc. | 92.1 | 98.2 | 100 |
|  | F1a | 92.5 | 96.4 | 100 |

-continued

| Dataset | Metric | Avg. | Best | Ensemble |
|---|---|---|---|---|
| RTE | Acc. | 92.4 | 93.5 | 92.8 |
| ReCoRD | EM | 88.4 | 90.2 | 90.6 |
|  | F1 | 90.5 | 91.8 | 92 |
| MultiRC | EM | 65.7 | 66.3 | 67.2 |
|  | F1 | 89 | 89 | 89.4 |
| WiC | Acc. | 76.2 | 76.8 | 77.9 |
| WSC | Acc. | 91.7 | 93.3 | 93.3 |
| SuperGLUE |  | 88.5 | 89.8 | 90.5 |

To demonstrate the viability of prompt ensembling, the system can train five prompts for each SuperGLUE task, using a single frozen T5-XXL model with 100K steps of LM adaptation and a prompt length of 100. In some implementations, the systems and methods can use simple majority voting to compute predictions from the ensemble. The results in Table 3 can show that the prompt ensemble outperforms the single-prompt average on all tasks, and, with the exception of the RTE and WSC, can outperform any individual prompt. The ensemble of prompts can also produce a stronger overall SuperGLUE score than using the best performing prompt for each dataset.

Table 3 can convey the performance of a five-prompt ensemble, using a single frozen T5-XXL model throughout. Prompt ensembling can outperform the strongest prompt on all datasets except for RTE (RTE (Recognizing Textual Entailment), PAPERSWITHCODE (Mar. 23, 2022, 9:40 PM), https://paperswithcode.com/dataset/rte.) and WSC. The ensemble SuperGLUE score can also outperform using the best prompt from each dataset.

Today's deployment of tuned models for NLP tasks can miss out on potential resource savings, given the similar histories of the models being served. Many downstream NLP models can originate from a small pool of pre-trained models such as BERT and a few others. However, there is no easy way to utilize the shared elements between the end models, given that model-tuning changes the parameter space of the pre-trained model in unpredictable ways. As these downstream tasks can have different workload schedules and requirements, and it can be quite common that their reserved resources are underutilized.

Prompt tuning can offer a solution to the redundancy of parameters across models and the under-utilization of resources due to the heterogeneity of workloads. It can allow the system to combine resources toward larger models that could serve many downstream tasks at once. If any specific client cannot saturate the model bandwidth of computation, the system can feed the model batches from different clients or downstream tasks without any model swapping. Moreover, the system can go even further by interleaving examples within the same batch for more fine-grain utilization (see FIG. 2).

The specific flexibility can be crucial for wide adoption of giant models (100B+ parameters). Prompt tuning can reduce the computation spent during the model adaptation phase, as well as the resources required for serving. Both savings can improve the environmental impact of giant models.

Prompt tuning can be a competitive technique for adapting frozen pre-trained language models to downstream tasks. On the popular SuperGLUE benchmark, the prompt tuning task performance can rival that of traditional model tuning, with the gap vanishing as model size increases. On zero-shot domain transfer, prompt tuning can lead to improved generalization ability. This can be an indication that freezing general-purpose language understanding parameters and restricting downstream learning to a lightweight parameter footprint can help to avoid overfitting to a specific domain.

Additionally and/or alternatively, the systems and methods can use frozen pre-trained models for improved storage and serving costs. The frozen models can enable both efficient multi-task serving as well as efficient high-performing prompt ensembling.

The ability of the prompts to match the performance of model tuning can suggest that task definitions exist in their own subspace of parameters. In some implementations, the systems and methods can factor out task-defining parameters as distinct from general language-modeling parameters is an exciting step that opens up several avenues for new research.

In the task subspace, the system can measure the capacity required to capture a specific task by varying the prompt length in the spirit of experiments conducted. This task complexity metric can enable the system to understand better which categories of tasks can rely on either more training data or higher capacity pre-trained language models.

Measuring the similarity of tasks utilizing their prompt representations can provide an efficient means of searching the growing number of publicly available labeled datasets and can identify which tasks could benefit each other.

Relations in the task subspace may be deducible from their descriptions. For example, the system can learn to translate from German to English by manipulating the task prompt for an English to German task with a learned operator that flips the order of the arguments.

Semantic Search Training, Meta-Prompt Training, and Visual Prompt Training

The systems and methods for prompt tuning using one or more machine-learned models can include one or more additional and/or alternative training techniques. The systems and methods for prompt tuning may include a variety of techniques for prompt generation or tuning. For example, the systems and methods can include semantic searching for finding similar prompts to use for further tuning. Additionally and/or alternatively, the systems and methods can generate and/or utilize a meta-prompt for prompt generation and tuning.

For example, the systems and methods disclosed herein can leverage semantic searching of prompts to obtain larger datasets, which may then be used for prompt tuning or may be used for other purposes. For example, the systems and methods can include obtaining an example dataset. The example dataset can be processed to train a first prompt. In some implementations, the systems and methods can include determining one or more second prompts are associated with the first prompt. One or more second prompt datasets can be determined to be associated with the one or more second prompts. The one or more second prompt datasets can then be used to retrain the first prompt to generate the augmented first prompt.

Additionally and/or alternatively, the systems and methods can include a prompt tuning training API that can allow a user to train a prompt, to be used with a large frozen model, for their task via interactions with a server and handles the actual model inference. In some implementations, the prompt tuning training API can be used for making predictions with the model and prompt, and therefore, allowing users to leverage a large model without dealing with the issues of deployment. The users can train the prompt without having to reveal their full dataset to the server, and the server may not have to reveal information about the frozen model, like architecture, weights, etc. In some implementations, the prompt may be trained by a user by using the API by utilizing multi-task training. Multi-task training may involve parameters being combined for multiple tasks. Such a system and/or method can allow a user computing device with limited computational resources (e.g., a constrained memory space or limited processing power) and/or a limited amount of data stored thereon to leverage a large model and additional datasets stored in a server to train a prompt for use by the user computing device.

The learned prompts can then be used to create a large database of prompts for dataset mapping. Similarity search in this prompt space can be used to find and retrieve related datasets, ordered by the similarity of the prompt. The returned datasets can then be used for techniques like multi-task learning, curriculum learning, and visualization. Users can submit their own datasets and accompanying prompt to the database.

Prompt tuning can be costly as prompt tuning can involve forward and backward passes of large models, making the process hard to scale to thousands and thousands of tasks. Therefore, the systems and methods may utilize a meta-prompt, a prompt that generates prompts, and the meta-prompt can be used to generate prompts for a large variety of tasks.

Additionally and/or alternatively, prompt tuning can be used to produce a meta-prompt from a representative part of a dataset. The meta-prompt can then be used to generate prompts. These generated prompts can then be used with input examples to solve a task.

In some implementations, the systems and methods can be applied to natural language processing but may be trained for computer-vision tasks.

A prompt can correspond to and/or represent a task. In some implementations, prompts can be trained to generate data associated with a respective dataset. Moreover, the prompts can include one or more learned parameters representative of a task.

In particular, the systems and methods disclosed herein can include one or more of semantic search for prompt tuning, meta-prompt generation and use, prompt tuning training API, and vision prompt tuning. Example implementations of each aspect can be implemented and configured in a variety of ways as disclosed below. Each aspect can be implemented individually or in any combination. For example, in one example implementation, a meta-prompt can be generated and used to generate a prompt, the prompt can be used as a query for semantic search, and the results can be used for tuning the generated prompt and the meta-prompt. These aspects can be implemented into a prompt tuning training API for individual task training or for multi-task training. In some implementations, the prompts can be vision prompts generated based on vision task training (e.g., pad tuning training, channel tuning training, mask tuning training, and/or prompt tuning for a vision transformer).

The systems and methods disclosed herein can leverage semantic searching of prompts for prompt tuning. In some implementations, the systems and methods can include obtaining an example dataset from a user.

The example dataset can be processed with a machine-learned model to train a first prompt. In some implementations, the first prompt can be trained to generate data associated with the example dataset. In some implementations, the systems and methods can include using a prompt tuning training application programming interface. The prompt tuning training application programming interface can include one or more machine-learned models, and the one or more machine-learned models may include the one or more prompt tuning models.

The systems and methods can then determine one or more second prompts are associated with the first prompt. The one or more second prompts can be obtained from a plurality of stored prompts stored on a server computing system.

In some implementations, a search of a prompt repository can be performed to identify similar prompts to the first prompt. The one or more second prompts can then be determined based on the search of the prompt repository. The prompt repository can include a library of pretrained prompts. In some implementations, the prompt repository can include prompts generated based on datasets from a plurality of users.

In some implementations, the systems and methods can include generating a similarity score for each of the one or more second prompts. The similarity scores can be determined based on a similarity between the first prompt and the second prompt. Additionally and/or alternatively, determining the one or more second prompts can include a semantic search. In some implementations, the semantic search can include the use of an L2 metric, a cosine metric, or a max product metric.

In some implementations, the one or more second prompts can be determined based on a semantic search of a library of prompts stored with associated metadata for each respective prompt of the library of prompts. The associated metadata can include at least one of a frozen model utilized for training the respective prompt, a training date for the respective prompt, or a training dataset for the respective prompt.

The systems and methods can then generate an augmented first prompt with the machine-learned model based at least in part on the one or more second prompts. Generating the augmented first prompt can involve retraining the first prompt on one or more second prompt datasets associated with the one or more second prompts with the highest similarity scores.

In some implementations, the systems and methods may include obtaining second prompt metadata associated with the one or more second prompts. The second prompt metadata can include one or more second prompt datasets associated with the one or more second prompts. The second prompt metadata and the example dataset can be processed with the machine-learned model to generate the augmented first prompt. In some implementations, generating the augmented first prompt can include multi-task learning based on the one or more second prompts. In some implementations, mixture rates (e.g., how much of each dataset to use) can be based on prompt similarity. Additionally and/or alternatively, generating the augmented first prompt can include curriculum learning based at least in part on the one or more second prompts. In some implementations, generating the augmented first prompt can include using the second prompts as an initialization point for retraining the initial prompt. Additionally and/or alternatively, the second prompt(s) can be used to generate combinations of the prompt.

The augmented first prompt can then be utilized to generate one or more datasets, which can then be stored in a database to train or retrain future prompts. In some implementations, the augmented first prompt can be stored in a library of prompts and may be used for semantic search prompt tuning of other prompts.

The systems and methods disclosed herein can use prompt tuning to build a representation of a dataset (the prompt) that can be used to build a semantic search over datasets. The results from querying the database can then be used to augment the user's dataset or training procedure in various ways.

The systems and methods for prompt tuning utilizing semantic search can receive a small dataset from a user to train a prompt, and the trained prompt can then be used to search for similar prompts for prompt tuning (e.g., prompt retraining). The users can have a small dataset they want to expand, augment, do better on, quantify, or overall refine. The user can send one or more (example, label) pairs to be used as input for the prompt tuning system. In some implementations, the prompt tuning system can include one or more prompt tuning machine-learned models and/or a prompt training application programming interface (API).

For example, a user can have one-or-few-shot examples for a task they want to do well on. Instead of collecting more data, the users can utilize a prompt tuning semantic search feature to find datasets, tasks, and prompts that are similar to their task. In some implementations, the prompt tuning semantic search can begin with a user sending a prompt tuning API a small dataset of examples.

An initial/query prompt (e.g., a low quality prompt) can be trained with the dataset. For example, the server, or the server in coordination with the user via the prompt tuning API, can train an initial prompt based on the examples the user provides. Alternatively and/or additionally, the first prompt may be generated with the use of a meta-prompt for prompt generation.

A semantic search can then be completed to find one or more associated prompts (e.g., similar pretrained prompts). For example, the semantic search can involve comparing the initial/query prompt to a library of pretrained prompts, supplied by the service/cloud provider for various tasks. Each prompt can have associated metadata. Multiple metrics such as L2, cosine, or max product can be used to determine similar prompts.

The initial user prompt, or first prompt, can then be utilized for semantic search over a library of prompts (e.g., a library of second prompts, in which the library of second prompts includes pretrained prompts trained based on datasets not used by the user). These prompts can have associated metadata, such as the frozen model used, the date trained, and, most importantly, the dataset used.

The search can use a similarity function between prompts such as cosine distance. In some implementations, the library of prompts can be built by pre-training a plurality of prompts on a large collection of open-source tasks/datasets. The library of prompts can be stored on a server computing system that allows other users to upload their own prompts for generating a larger library. User supplied prompts can be provided as freely accessible to all or can be provided as restricted to certain users (e.g., a prompt may only be accessible to users with certain credentials or may be accessible in exchange for other resources), establishing a service for curated datasets. The utility of the prompts can be determined by a variety of metrics and the determined utility may be utilized for prompt ranking and/or for user ranking. In some implementations, the library of prompts can include prompts trained on a single dataset and/or prompts trained on a plurality of datasets. The prompts may represent a particular task.

The prompts (i.e., second prompts) determined to be associated with the first prompt and the metadata related to those prompts, can be ordered by their similarity to the query prompt. The second prompts, and associated metadata such as links to the dataset and prompt submitter information, can be returned to the user. The second prompts and/or their associated metadata can then be utilized to retrain or refine the first prompt. The prompt tuning can involve curriculum learning, multi-task learning, and/or retraining with the most similar second prompts being utilized as initialization points.

For example, the returned datasets associated with the second prompts can be utilized for curriculum learning. Curriculum learning can involve ordering the datasets by how similar their respective prompt is to the user prompt, before finally re-training on their own dataset to create a final prompt. Therefore, the users can use the returned datasets to do curriculum learning. Training on one task at a time ordered by increasing similarity to their task before finally retraining with their original examples. In some implementations, the order can be determined based on prompt similarity.

Another possible implementation for prompt tuning with the second prompts can involve determining the most similar second prompt or a combination of the most similar second prompts and using the one or more determined most similar prompts as the initialization for another round of training.

For example, the users can use the prompts returned as an initialization point for their prompt. The initialization point setting can be done with the most similar prompt or a combination of multiple prompts. The combination of the multiple prompts can be weighted by the similarity of the prompt. Alternatively and/or additionally, the combination can include a default equal combination.

Alternatively and/or additionally, the returned datasets associated with the second prompts can be used for multi-task learning in conjunction with the user-input dataset (i.e., example dataset). In some implementations, the users can use the returned datasets for multi-task learning to boost performance on their actual task. The mixing rates of different datasets can be adjusted based on the similarity of the dataset's respective prompt and the initial user prompt.

Alternatively and/or additionally, a user can utilize the resulting tasks for a variety of uses (e.g., visualization, ranking of task difficulty, etc.). The user may be able to contact the original developers of these prompts via the user interface of the semantic search prompt tuning API in order to collaborate on future work.

The systems and methods can be repeated iteratively to continue to refine, or tune, the prompt. The user may repeat this process, using the resulting prompt, until the user reaches a result they are happy with. Moreover, in some implementations, after the first cycle the user can send the resulting prompt directly to the semantic search API, instead of re-training a prompt on the user examples. The systems and methods disclosed herein can also allow for use of the semantic search API for other applications such as task search and task complexity analysis.

Benefits of leveraging semantic search for prompt tuning can include enabling the use of similar datasets (e.g., for data augmentation) to increase user model performance. Moreover, the systems and methods for prompt tuning using semantic search can allow for the use of public datasets and can allow for the addition of user datasets to the collection. In addition, the systems and methods can be implemented to allow users a medium to find others working on similar problems and reach out for collaboration.

Additionally and/or alternatively, the systems and methods disclosed herein can be utilized for generating a meta-prompt that can generate prompts based on an input. For example, the meta-prompt can be a prompt that is trained to generate prompts based on input datasets or input descriptions.

The systems and methods can include obtaining a plurality of training datasets. The plurality of training datasets can be obtained from a user computing device, and the meta-prompt can include a user-specific meta-prompt. Alternatively and/or additionally, the meta-prompt may include a general purpose meta-prompt.

The plurality of training datasets can be processed to train a training prompt for each respective dataset. In some implementations, the training prompt can be trained to generate data associated with the respective dataset.

One or more canonical examples can be selected from each of the plurality of training datasets. In some implementations, selecting the one or more canonical examples from each of the plurality of training datasets can include determining a specific training dataset from each of the plurality of training datasets based on a dataset-specific prompt generated based at least in part on the specific training dataset and a frozen model.

The systems and methods can include generating an example dataset based on the plurality of canonical examples.

The example dataset can then be utilized to generate a meta-prompt. In some implementations, the meta-prompt can be configured to generate a predicted prompt based on the plurality of canonical examples.

After the meta-prompt is generated, the systems and methods can further train the meta-prompt for refined prompt generation. The systems and methods for training and refining the meta-prompt can include obtaining an aggregated dataset. The aggregated dataset can include an aggregated example and a respective label. The aggregated example and the meta-prompt can be processed with a prompt creation model to generate a task-specific prompt for the second example dataset. The task-specific prompt and the second example dataset can then be processed with a prediction model to generate a prediction. The prediction and the respective label can then be compared in order to evaluate a loss function. One or more parameters of the meta-prompt can then be adjusted based on the gradient of the loss function.

Alternatively and/or additionally, the meta-prompt can be tuned or refined by obtaining an aggregated example, in which the aggregated dataset can include a task description. The systems and methods can process the task description and the meta-prompt with a prompt tuning model to generate a task-specific prompt for the task description. The task-specific prompt, an example, and the task description can be processed with a prediction model to generate a prediction. The prediction can then be used in order to evaluate a loss function (e.g., the loss function may be evaluated by comparing the prediction and a respective label for the example.). One or more parameters of the meta-prompt can then be adjusted based on the loss function.

Once the meta-prompt is generated, the meta-prompt can be stored on a server computing system to be utilized for prompt generation and refinement. The systems and methods for prompt generation can include receiving a prompt request from a user computing device and generating a requested prompt based on the prompt request and the meta-prompt. The requested prompt can then be sent back to the user computing device.

Prompt tuning can involve a large labeled dataset where the prompt representation is learned via back propagation. However, that technique can involve full forward and backwards passes of the model. Therefore, the computational complexity of prompt tuning can be the same as model tuning despite prompt tuning only updating a single parameter. Thus, the training can still be costly, especially if one intends to create a huge library of prompts.

The systems and methods disclosed herein can be utilized for generating a meta-prompt, which can reduce the computational cost for generating and tuning prompts. A meta-prompt can be a prompt, learned via prompt tuning, that when processed with a few input examples produces a prompt. The output prompt can be used by the machine-learned model (e.g., the frozen model) to solve the task sketched by the input examples. The meta-prompt can enable the scaling to a library of millions of prompts.

Generating a meta-prompt can involve processing a plurality of datasets, a plurality of labels, and a plurality of prompts in order to train one or more parameters that can allow the meta-prompt to generate prompts based on input datasets. The trained meta-prompt can be used for generating prompts on out of domain datasets and/or may be used to generate new or refined prompts for in-domain datasets.

For example, the systems and methods for generating a meta-prompt can include generating or obtaining a plurality of datasets. The plurality of datasets can include a variety of datasets representative or descriptive of a plurality of different tasks. The plurality of datasets can be obtained from a public repository and/or generated with one or more machine-learned models. In some implementations, the plurality of datasets can include public datasets, synthetic datasets harvested from the web, internal datasets, etc. The datasets can be vertical specific to create several meta-prompt offerings, each catering to users from different domains.

The systems and methods for training and/or generating a meta-prompt can include training a training prompt for each dataset of the plurality of datasets. Each dataset can be processed to generate the training prompt for each respective dataset. The dataset and prompt pairs can then be used to generate a meta-prompt or may be used to generate a database or library to enable the semantic search prompt tuning discussed herein. In some implementations, a frozen model can be used for training and/or may be used for implementation of the meta-prompt prompts.

The systems and methods can then include selecting canonical examples from the dataset. In some implementations, the canonical examples can be selected based on the generated prompt. The canonical examples can be representative examples from the datasets. In some implementations, five to ten examples can be selected from each dataset, in which each example is representative of that dataset. Additionally and/or alternatively, a frozen model can be used for selection.

Data selection may involve selecting examples whose model encoding is most similar to the centers of k-means clusters, selecting examples who are close to the decision boundary of the prompted model, and/or selecting examples that are similar but have opposite labels. In some implementations, data selection can be exposed as a secondary service to help users generate prompts later on.

The canonical examples can then be used to generate a dataset of few-shot examples for the prompts. The few-shot examples for the prompts, or example dataset, can then be utilized to train, or generate, a meta-prompt. Generating, or training, a meta-prompt that generates prompts can involve processing the example dataset and prompt pairs of the example dataset with a machine-learned model. The input to the model can be the prompt and the (input, output) pairs (e.g., an example and a prompt) that make up the examples.

The model can output a prompt with the first K tokens of the encoder. A loss can be calculated between the predicted prompt and the actual prompt produced for this dataset. The losses can include, but are not limited to, L2, Von Mises Fisher, and/or Cosine Distance.

When paired with examples from a dataset the meta-prompt can be used to generate a new prompt that will solve the task specified by the examples. In some implementations, the frozen model can be used to generate the prompts. Reading the example text can involve language understanding using a strong pretrained encoder. The strong pretrained encoder can process the input the same way the prompted frozen model can.

In some implementations, meta-prompt creation may involve joint training. In some implementations, the systems and methods for meta-prompt tuning can involve inputting a meta-prompt and one of the aggregated datasets into the model. A single meta-prompt variable may be initialized. The variable can be unique, dataset-independent, and may be updated as we train. The prompt variable and one of several aggregated datasets may be fed into our prompt generation model. The model can either be shared or disjointed from the pretrained frozen model that may take the output of this model (e.g., the generated prompt) as input. The model and the frozen model may be initialized to match in order to have a shared language understanding.

A dataset may be aggregated (e.g., multiple ways, sampling of examples, concatenation, encoding via a model, selection of representative examples, etc.). The model can output a prompt for that dataset. The prompt generation model can generate a prompt value based on the meta-prompt and the aggregated dataset. The generated prompt can be used with a downstream frozen model to solve examples from our dataset. The prompt can then be replicated and added to each example in a batch from the dataset. For example, the generated data-dependent prompt can be added to each example in a batch from the dataset, to be used in prompt tuning.

The data-dependent prompt and example can then be fed into the model to make a prediction. More specifically, in some implementations, the generated prompt and the example batch can be fed into the frozen model, a forward pass can be done, and a prediction can be created. A loss can then be calculated, and the error can be backpropagated all the way back to the meta-prompt producing a gradient. The labels from the example batch are used to calculate a loss and do backpropagation through both networks, all the way back to the meta-prompt.

The meta-prompt can then be updated based on its gradient, and the process can be repeated again. Each iteration can use a different dataset, a different batch of examples, a different result of any sampling aggregation, etc.

In some implementations, meta-prompt generation can be provided as a service. For example, a user can send multiple datasets to the server computing system. A user can use the meta-prompt service to generate a meta-prompt that is specific to the user and their data.

The systems and methods for using the meta-prompt service can begin with the user uploading their multiple datasets to the server computing system. To expand the number of datasets, which can increase meta-prompt quality, the user can use the prompt tuning semantic search API to find related datasets to include. In some implementations, the server computing system can generate a meta-prompt based on the supplied user datasets. The model can return the user-specific meta-prompt for the user dataset, and the server computing system can then send the meta-prompt back to the user computing system. The meta-prompt can then be stored by the user computing system to be later used for prompt generation. The generated meta-prompt can then be utilized for model inference and prompt generation. For example, a few-shot dataset can be input as multiple (example, label) pairs into a model with a meta-prompt in order to generate a prompt, which can be used to solve a task defined by the (example, label) pairs.

In some implementations, examples can be selected with a data selection service that helps select examples that can generate better prompts when used with a frozen model. In some implementations, the inputs and the meta-prompt can be processed by a frozen model. Additionally and/or alternatively, the user input may include a task to be completed by the prompt to be generated. In some implementations, a server computing system may first train a prompt on the labeled examples and then may use the prompt tuning semantic search API to find one of many meta-prompts that can be specific to some vertical.

The model can output a prompt, which can then be provided to the user who input the dataset. The user may then input the generated prompt and the example into a model for model inference. In some implementations, the prompt can be generated and processed for model inference by a singular model, which can include one or more sub-blocks.

In some implementations, the systems and methods for model inference leveraging a prompt generated with a meta-prompt can involve a server computing system. For example, the server computing system can run the model a first time to generate a task-specific prompt from the example dataset and the meta-prompt. The server computing system can then run the model again. The second time can be with the task prompt and an example input.

The model can be fed the prompt and example input. The model can be the same one used to generate the prompt or may be a different model separate from the first model. The model can then return a prediction. The model can then make a prediction, which can then be returned to the user. In an implementation with a server computing system, the server can return the prediction to the user, the inner loop can be the model inference.

Benefits of a meta-prompt generation and use can include the ability to scale the creation of prompts to many, many more tasks; the ability to create vertical-specific meta-prompts for certain domains; and an API to create client-specific meta-prompts for a specific user.

Additionally and/or alternatively, the systems and methods can be implemented as part of a prompt tuning service (e.g., a prompt tuning user interface may be provided to users as part of a prompt tuning web service). The prompt tuning service can utilize a prompt tuning application programming interface.

The systems and methods can include obtaining a training example (e.g., an example dataset and a label) and a prompt from a user computing device. In some implementations, the training example can be associated with the prompt. In some implementations, the prompt can include a general prompt and a task-specific prompt.

The training example can include one or more examples and/or one or more task descriptions. The training process can involve supervised training or unsupervised training. Therefore, the training example can be a supervised example or an unsupervised example. In some implementations, the training example can include an example and a label, in which the label is a respective label for the example. Additionally and/or alternatively, the training example can be a fine-tuning example or a pre-training example.

The training example (e.g., the example dataset and the respective labels) and the prompt can be processed with a machine-learned model (e.g., a frozen model) to generate one or more prompt gradients. The prompt gradient can be based at least in part on a difference between the label and a predicted label. The predicted label can be generated based on the example.

Processing the training example (e.g., the example dataset and the label) and the prompt with the frozen model to generate the one or more prompt gradients can include a forward pass of the frozen model with the training example and the prompt; and a backwards pass to return the prompt gradients. The one or more prompt gradients can be sent to the user computing device.

In response to the prompt gradients, the user computing device may receive one or more inputs, which can be used to generate a user-input. The user-input can be sent to the server computing system. The server computing system can receive a user-input to augment the prompt. An augmented prompt can be generated based on the user-input. For example, in some implementations, the user-input can include approval of, or interactions with, the prompt gradient, which can be sent to the server which will cause the server computing system to update and return a new prompt. Alternatively and/or additionally, the user can update the prompt based on the gradient with whatever optimization strategy they want (e.g., in some cases, the user may track an optimizer state, which can be included in a user-input). The updated prompt may then be sent to the server computing system.

Additionally and/or alternatively, the systems and methods can include a training API for prompt tuning that can remove or reduce the computational cost for user computing devices (e.g., a user computing device). The training API for prompt tuning can allow anyone to leverage a large scale model. The training API can allow access to the model itself (e.g., through models as a service, MaaS). The technique can be similar to offering a bare metal/VM server that the user can do what they want with instead of a specific high-level application (e.g., text classification which would be like a managed database instance).

The systems and methods disclosed herein can involve a prompt tuning training API. The prompt tuning training API can be configured to receive data. The data can include an example, a label, and a prompt (e.g., example: str, label: str, prompt: tensor). The data may be input and received by the API in order to train a model on their dataset. In some implementations, the dataset can include a collection of characters (e.g., numbers, letters, or symbols), visual data (e.g., images, videos, iconographic symbols, etc.), and/or audio data (e.g., music data, speech data, etc.).

The API can run the inputs through a forward pass of the frozen model. For example, the server computing system that is optimized for running the frozen model (distributed across machines and datacenters, uses specialized accelerators, and support for model parallelism), can perform a forward pass of the model. The example can be used as an input to the model, and the prompt can be prepended to the input. This forward pass may produce a label and may be used as a prompt tuning inference for the API. In some implementations, the one or more machine-learned models can be frozen in order to batch multiple users. Therefore, the systems and methods can keep the language model in memory.

A backwards pass can then be completed in order to return gradients. More specifically, in some implementations, a standard backpropagation yielding gradients for one or more parameters can be generated based on the loss between the predicted label and the supplied label.

The prompt gradients may be provided to the computing system that input the inputs. The inputting computing system may not have access to the frozen model, and the model as a service (MaaS) computing system may not have access to the full dataset or the prompt parameters.

The input computing system may update the prompt based on the received gradients using a variety of methods (e.g., user-input updates or automated updates). The process for training may continue until convergence or until the user ends the training process.

Additionally and/or alternatively, the systems and methods disclosed herein can be used for prompt tuning multi-task training and may involve an API configured for prompt tuning multi-task training. The systems and methods can include combining a general prompt and task specific prompt (e.g., a user may combine a general prompt for a group of tasks and a task-specific prompt for a specific task.).

Moreover, the combination can include a shared prompt that is the same value for each task and a set of N task prompts, one for each task. The shared parameter can represent a mixture of tasks, or the shared parameter can be used across a whole computing system network, making it more of a user-specific, or network-specific, prompt.

The first step can have a user combine the shared and task-specific prompts through a composition function of the user's choice. Example combinations can include, but are not limited to, addition, concatenation, and projection with an affine transform. The combination can also keep the user in control of the model parameters. In some implementations, the users may send the server a dataset (e.g., example: str, label: str, prompt: tensor).

A forward pass of a frozen model with the prompt can be completed. The optimized server can compute the forward pass based on the user's input example and their prompt, which can be the combination of the shared and task prompts. The output can be a label and can be used for a multi-task inference API.

A backwards pass can then be completed in order to return prompt gradients. The prompt gradients can be based on the predicted label and the user provided label. The combined prompt gradient can be returned back to the user or may be used internally to adjust the parameters of the one or more prompts. In some implementations, the user computing system may update the prompts based on the prompt gradients. For example, updating parameters for their shared prompt and task-specific prompt based on the gradient of the combined prompt. The user can use the gradient of the combined prompts to derive the gradients of the shared prompt and the task-specific prompt. The user can then use these parameters to update each prompt using whatever update rules they choose.

The user can then repeat the process for other examples in their various task datasets. The user can update their prompts with a variety of techniques. The system can repeat this processing, varying the input example, the task they are running (and therefore the task specific prompt) while using the same shared prompt.

Benefits of the API systems and methods can include the model can be utilized by a plurality of users, while limiting the details and parameters shared between users, and a user can produce several prompts for a simple ensemble effect.

Furthermore, by leveraging the computational resources of a server and the datasets stored thereon, a user can train prompts on a user computing device with limited computational power and with limited data. Typically, such user computing devices have constrained memory spaces that cannot be used to store large models and a large amount of training data.

The systems and methods disclosed herein can be utilized for prompt tuning for natural language processing tasks, computer vision tasks (e.g., the input to the model can be a prompt alongside an image, and the output can be an image classification and/or the location of objections in the image), audio processing tasks (e.g., he input to the model can be a prompt alongside an audio sample, and the output can be a classification of the audio sample), or a variety of other tasks. Prompt tuning for vision tasks can involve one or more of pad tuning, channel tuning, mask tuning, and/or prompt tuning for a vision transformer. For the prompt tuning, a set of inputs and a learnable prompt can be processed with one or more machine-learned models with a standard forward pass to generate a prediction. The prediction can then be compared against a respective label (e.g., a ground truth label for the respective inputs and prompt) in order to evaluate a loss function. The results of the loss function can be output after a backwards pass where only the prompt is updated.

For pad tuning, the learnable variable can be a border around the image (e.g., the learnable variable can be encoded in a strip of pixels of a fixed width running around the edge of the image). For channel tuning, the learnable variable can be another channel of the input. For example, the image may include three color channels and a prompt channel. For mask tuning, the learnable variable can be a mask that is applied to the input. Additionally and/or alternatively, prompt tuning for a vision transformer can involve unrolling the image into a sequence of patches (e.g., inputs) like in a vision transformer and can then apply prompt tuning to the sequence of patches.

The systems and methods disclosed herein can be used to generate one or more prompts for image-based tasks. The systems and methods can then be used for image processing. For example, the systems and methods can include obtaining an input image and a prompt. The prompt can be structured as at least one of a padding variable around the border of the input image, a channel variable for the input image, or a mask variable for the input image. In some implementations, the systems and methods can include processing the input image with a machine-learned model to generate a prediction. The prediction can be a generated classification (e.g., data indicative of a classification of the image into one of a plurality of classes, such as a probability distribution over classes), a generated image caption, a generated new image, a generated augmented image, a text document based on the input image, and/or object detection (e.g., the location of an object in the image that corresponds to the prompt). The systems and methods can include providing a prediction as an output. The prediction may be provided to a user computing device. In some implementations, the prediction can be provided as part of a user interface associated with application programming interface provided as part of a prompt model inference service.

The systems and methods disclosed herein can use a variety of machine-learned model architectures with a variety of sub-blocks. For example, the systems and methods can utilize a transformer for training and/or using the prompts. Moreover, the prompts can be used to complete a variety of different tasks for a variety of different fields of study or work.

Training a prompt can be trained with one or more training processes for training one or more parameters. In some implementations, a prompt can be trained similarly to training a machine-learned model. Moreover, in some implementations, a machine-learned model and the prompt can be trained simultaneously. Alternatively and/or additionally, the prompt can be trained as an extension of the machine-learned model.

In some implementations, systems and methods for training a prompt can include inputting a prompt into a machine-learned model to generate an output (e.g., the prompt can correspond to a question, and the output can be an answer.). The output can be analyzed, and the results of the analysis can be backpropagated. For example, the output can be assessed or evaluated to determine whether to modify one or more parameters of the prompt. In some implementations, one or more parameters of both the machine-learned model and the prompt may be adjusted in response to the evaluation of the output. Alternatively and/or additionally, the machine-learned model can be held fixed during the training of the prompt.

The systems and methods can include jointly training a prompt tuning model and a meta-prompt. Alternatively and/or additionally, the meta-prompt and the prompt tuning model may be trained separately. Training can involve obtaining a training example and a meta-prompt. The training example and the meta-prompt can be processed with a prompt tuning model to generate a task-specific prompt. The task-specific prompt and an example can be processed with the prompt tuning model or another machine-learned model to generate a prediction. The prediction can be assessed, and based on the assessment, one or more parameters of the prompt tuning model and/or the meta-prompt may be modified.

In some implementations, training can involve obtaining a training example. The training example can be processed with a prompt tuning model to generate a task-specific prompt. The task-specific prompt and an example can be processed with the prompt tuning model or another machine-learned model to generate a prediction. The prediction can be assessed, and based on the assessment, one or more parameters of the prompt tuning model may be modified. Assessing the prediction can involve evaluating a loss function by comparing the prediction to a label for the processed dataset.

Moreover, model inference can be completed with or without a meta-prompt. For example, a machine-learned model (e.g., a prompt tuning model) can process a prompt to generate a prediction. In some implementations, the machine-learned model may be fixed. A large frozen model may be utilized for leveraging a large quantity of data. In some implementations, the machine-learned model can process both a prompt and one or more examples in order to generate the prediction. Alternatively and/or additionally, the machine-learned model (e.g., a prompt tuning model) can process a meta-prompt and an example to generate a prediction. The machine-learned model can be configured to utilize the meta-prompt for generating a prompt, and the prompt can be processed to generate the prediction. The prediction can involve generated text data associated with a task, in which the text is generated based on the one or more examples and/or the one or more prompts. In some implementations, the prediction can include text data, audio data, image data, a classification, and/or latent encoding data.

The systems and methods of the present disclosure provide a number of technical effects and benefits. As one example, the system and methods can provide a semantic search that can allow for the determination and isolation of similar prompts to use for retraining or tuning. More specifically, the systems and methods can process an example dataset to generate a first prompt, the first prompt can be semantically searched to find one or more similar second prompts, and the second prompts can be used for retraining.

Another example technical effect and benefit relates to improved computational efficiency and improvements in the functioning of a computing system. For example, a technical benefit of the systems and methods of the present disclosure is the ability to generate meta-prompts, which can be used for generating new prompts. In some implementations, the generated meta-prompts can allow for localized prompt generation with a lessened computational cost. Similarly, prompt tuning with the prompt tuning training API can allow for a user to leverage a server computing system with a database of prompts to generate prompts even if the user has a computing device with limited computational resources.

Another example technical effect and technical benefit of the systems and methods can include the ability to generate and tune prompts for a variety of tasks including natural language processing tasks, computer vision tasks, and/or audio processing tasks. For example, the systems and methods disclosed herein can generate and tune prompts for computer vision using vision models. The use of pad tuning, channel tuning, and/or mask tuning can allow for visual prompts to be trained for data generation.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for prompt tuning, the system comprising:
one or more processors; and
one or more non-transitory computer-readable media that collectively store instructions that, when executed by the one or more processors, cause the computing system to perform operations, the operations comprising:
obtaining a training dataset, wherein the training dataset comprises a plurality of training examples and a plurality of training labels for the respective training examples;
processing, with a pre-trained machine-learned model, one or more training examples of the plurality of training examples and a prompt to generate a training output, wherein a plurality of pre-trained parameters for the pre-trained machine-learned model are fixed during prompt tuning, and wherein the prompt is associated with a particular task, wherein the particular task is associated with the one or more training examples;
determining a prompt gradient based at least in part on a comparison between the training output and one or more training labels associated with the one or more training examples;
adjusting one or more prompt parameters of the prompt based on the prompt gradient; and
storing, in a prompt database, the prompt with a task label associated with the particular task, wherein the prompt database comprises a plurality of prompts associated with a plurality of different tasks, wherein the prompt database is configured to be searched to obtain prompts associated with a selected task that are then processed with the pre-trained machine-learned model to generate an output associated with the selected task.

2. The system of claim 1, wherein the plurality of training examples comprise a plurality of text datasets, and wherein the particular task is a natural language processing task.

3. The system of claim 1, wherein the pre-trained machine-learned model comprises a model adapted to generate a text prediction output for text that follows an input text.

4. The system of claim 1, wherein the pre-trained machine-learned model was trained with text masking.

5. The system of claim 1, wherein the pre-trained machine-learned model comprises one or more encoder blocks and one or more decoder blocks.

6. The system of claim 1, wherein the operations further comprise:
obtaining input text data, wherein the input text data comprises one or more words;
processing the prompt and the input text data with the pre-trained machine-learned model to generate output text data, wherein the output text data comprises a plurality of text characters; and
providing the output text data as an output.

7. The system of claim 1, wherein the prompt is configured to be input with input data to the pre-trained machine-learned model to generate output data associated with the particular task, wherein the particular task comprises determining whether the input data comprises content associated with a positive intent.

8. The system of claim 1, wherein the prompt is configured to be input with input data to the pre-trained machine-learned model to generate output data associated with the particular task, wherein the input data comprises visual data, wherein the visual data comprises one or more images.

9. The system of claim 1, wherein the prompt is configured to be input with input data to the pre-trained machine-learned model to generate output data associated with the particular task, wherein the output data comprises output visual data, wherein the output visual data comprises one or more images generated based at least in part on the input data and the prompt.

10. A computer-implemented method for using a tuned prompt, the method comprising:
  obtaining, by a computing system comprising one or more processors, input data;
  obtaining, by the computing system, a prompt from a prompt database, wherein the prompt comprises one or more learned parameters associated with a particular task, wherein the prompt database stores a plurality of prompts associated with a plurality of different tasks, wherein each of the plurality of prompts comprises a set of learned parameters tuned to condition a pre-trained machine-learned model to perform a different task of the plurality of different tasks without task-based retraining of the pre-trained machine-learned model;
  processing, by the computing system, the input data and the prompt with the pre-trained machine-learned model to generate output data, wherein the output data is associated with the particular task associated with the prompt, wherein the prompt and the pre-trained machine-learned model were trained separately; and
  providing, by the computing system, the output data as an output.

11. The method of claim 10, wherein the pre-trained machine-learned model comprises a generative pre-trained transformer model.

12. The method of claim 10, wherein the pre-trained machine-learned model comprises an autoregressive language model.

13. The method of claim 10, wherein the pre-trained machine-learned model was originally trained with text masking and was re-trained for auto-completion.

14. The method of claim 10, wherein the prompt primes the pre-trained machine-learned model for the particular task.

15. One or more non-transitory computer-readable media that collectively store instructions that, when executed by one or more computing devices, cause the one or more computing devices to perform operations, the operations comprising:
  obtaining input data and one or more selections from a user, wherein the one or more selections are associated with a particular task;
  obtaining a prompt based on the one or more selections, wherein the prompt comprises one or more learned parameters associated with the particular task;
  processing the input data and the prompt with a pre-trained machine-learned model to generate output data, wherein the pre-trained machine-learned model is conditioned by the prompt to generate output data associated with the particular task, wherein the prompt was generated by learning the one or more learned parameters by processing training data with the pre-trained machine-learned model, wherein the parameters of the pre-trained machine-learned model are fixed during learning, and wherein the prompt comprises less than one one-hundredth of a percentage of a number of parameters of the pre-trained machine-learned model; and
  providing the output data as an output to the user.

16. The one or more non-transitory computer-readable media of claim 15, wherein the operations comprise:
  obtaining a second prompt, wherein the second prompt is associated with a second task;
  processing the input data and the second prompt with the pre-trained machine-learned model to generate second output data; and
  providing second output data to the user.

17. The one or more non-transitory computer-readable media of claim 15, wherein the particular task comprises a classification task, wherein the output data comprises text descriptive of a particular classification associated with the input data.

* * * * *